(12) United States Patent
Islam et al.

(10) Patent No.: US 9,088,976 B2
(45) Date of Patent: Jul. 21, 2015

(54) PROVISIONING RADIO RESOURCES IN A RADIO ACCESS NETWORK

(75) Inventors: Muhammad Khaledul Islam, Ottawa (CA); Ozgur Ekici, Escondido, CA (US); Jan Hendrik Lucas Bakker, Keller, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 466 days.

(21) Appl. No.: 13/459,205

(22) Filed: Apr. 29, 2012

(65) Prior Publication Data

US 2013/0288729 A1    Oct. 31, 2013

(51) Int. Cl.
*H04W 72/04* (2009.01)
*H04W 76/02* (2009.01)

(52) U.S. Cl.
CPC ........ *H04W 72/0406* (2013.01); *H04W 76/022* (2013.01); *H04W 76/027* (2013.01)

(58) Field of Classification Search
CPC ............ H04W 72/0406; H04W 72/04; H04M 1/72511
USPC ........................................................ 455/509
See application file for complete search history.

(56) References Cited

U.S. PATENT DOCUMENTS

| | | | |
|---|---|---|---|
| 7,177,658 B2* | 2/2007 | Willenegger et al. | 455/522 |
| 7,212,818 B2* | 5/2007 | Haumont | 455/435.1 |
| 7,336,659 B2* | 2/2008 | Meago | 370/390 |
| 7,929,686 B2* | 4/2011 | Bienfait et al. | 379/265.02 |
| 8,094,618 B2* | 1/2012 | Yi et al. | 370/329 |
| 8,228,852 B2* | 7/2012 | Yi et al. | 370/329 |
| 8,335,510 B2* | 12/2012 | Padfield et al. | 455/442 |
| 8,396,083 B2* | 3/2013 | Maheshwari et al. | 370/473 |
| 8,462,742 B2* | 6/2013 | Song et al. | 370/338 |
| 8,467,343 B2* | 6/2013 | Yi et al. | 370/329 |

(Continued)

FOREIGN PATENT DOCUMENTS

| | | |
|---|---|---|
| EP | 2136598 | 12/2009 |
| WO | 2010063316 | 6/2010 |
| WO | 2013019153 | 2/2013 |

OTHER PUBLICATIONS

International Searching Authority, "International Search Report and Written Opinion", issued in connection with PCT Patent Application No. PCT/CA2013/050321, mailed Jul. 24, 2013 (12 pages).

(Continued)

*Primary Examiner* — Hai V Nguyen
(74) *Attorney, Agent, or Firm* — Fish & Richardson P.C.

(57) ABSTRACT

A radio resource request in a radio access network (RAN) may be handled differently depending whether provision of the requested radio resource has been specified as optional (discretionary) or not optional (not discretionary). In the former case, the radio resource request may be discarded, rejected or delayed. In the latter case, the radio resource request may be accepted. In one embodiment, a running timer at a UE may indicate that a radio resource optionally to be provided was not provided by a RAN. When a subsequent request for the radio resource is accepted, the timer may be cleared. One or more UE applications may accordingly selectively subject user-plane data to be exchanged via the RAN, to a back-off delay scheme, to promoting acceptable responsiveness at UE applications that are, e.g. being actively used by a user. Radio resource requests may including RRC Connection Request and Cell Update messages.

25 Claims, 45 Drawing Sheets

(56) References Cited

U.S. PATENT DOCUMENTS

| | | | | |
|---|---|---|---|---|
| 8,515,436 | B2* | 8/2013 | Song et al. | 455/450 |
| 8,548,458 | B2* | 10/2013 | Huang et al. | 455/423 |
| 8,649,312 | B2* | 2/2014 | Kim et al. | 370/312 |
| 8,675,618 | B2* | 3/2014 | Lee et al. | 370/338 |
| 8,693,479 | B2* | 4/2014 | Somasundaram et al. | 370/394 |
| 8,792,423 | B2* | 7/2014 | Lu et al. | 370/328 |
| 8,811,201 | B2* | 8/2014 | Sachs et al. | 370/252 |
| 8,817,705 | B2* | 8/2014 | Yin et al. | 370/328 |
| 8,824,410 | B2* | 9/2014 | Kunz et al. | 370/329 |
| 2002/0110106 | A1* | 8/2002 | Koo et al. | 370/341 |
| 2004/0223513 | A1* | 11/2004 | Meago | 370/468 |
| 2005/0119008 | A1* | 6/2005 | Haumont | 455/456.1 |
| 2009/0052364 | A1* | 2/2009 | Gonsa et al. | 370/312 |
| 2009/0104906 | A1* | 4/2009 | Lee et al. | 455/435.1 |
| 2009/0252132 | A1* | 10/2009 | Song et al. | 370/338 |
| 2010/0034171 | A1* | 2/2010 | Pelletier et al. | 370/331 |
| 2010/0197315 | A1* | 8/2010 | Lindstrom et al. | 455/450 |
| 2011/0002304 | A1* | 1/2011 | Lee et al. | 370/331 |
| 2011/0110300 | A1* | 5/2011 | Sachs et al. | 370/328 |
| 2011/0171915 | A1 | 7/2011 | Gomes et al. | |
| 2011/0188451 | A1* | 8/2011 | Song et al. | 370/328 |
| 2011/0275365 | A1* | 11/2011 | Fischer et al. | 455/423 |
| 2011/0292854 | A1* | 12/2011 | Terry et al. | 370/311 |
| 2012/0009919 | A1* | 1/2012 | Huang et al. | 455/423 |
| 2012/0093110 | A1* | 4/2012 | Somasundaram et al. | 370/329 |
| 2012/0100853 | A1* | 4/2012 | Xiong et al. | 455/436 |
| 2012/0202491 | A1* | 8/2012 | Fox et al. | 455/435.1 |
| 2012/0246325 | A1* | 9/2012 | Pancorbo Marcos et al. | 709/227 |
| 2012/0287865 | A1* | 11/2012 | Wu et al. | 370/329 |
| 2012/0289183 | A1* | 11/2012 | Tiwari | 455/404.1 |
| 2013/0003250 | A1* | 1/2013 | Giese et al. | 370/329 |
| 2013/0003700 | A1* | 1/2013 | Zhang et al. | 370/331 |
| 2013/0016677 | A1* | 1/2013 | Kunz et al. | 370/329 |
| 2013/0039287 | A1* | 2/2013 | Rayavarapu et al. | 370/329 |
| 2013/0122903 | A1* | 5/2013 | Farnsworth et al. | 455/434 |
| 2013/0136032 | A1* | 5/2013 | Meirosu et al. | 370/254 |
| 2013/0170479 | A1* | 7/2013 | Fong et al. | 370/336 |
| 2013/0194941 | A1* | 8/2013 | Lu et al. | 370/252 |
| 2013/0208703 | A1* | 8/2013 | Sugimoto et al. | 370/331 |
| 2013/0260740 | A1* | 10/2013 | Rayavarapu | 455/422.1 |
| 2013/0260810 | A1* | 10/2013 | Rayavarapu | 455/509 |
| 2013/0260811 | A1* | 10/2013 | Rayavarapu | 455/509 |
| 2013/0288729 | A1* | 10/2013 | Islam et al. | 455/509 |
| 2013/0308578 | A1* | 11/2013 | Dwyer et al. | 370/329 |
| 2013/0324141 | A1* | 12/2013 | Jung et al. | 455/450 |
| 2014/0003348 | A1* | 1/2014 | Velev et al. | 370/328 |
| 2014/0045474 | A1* | 2/2014 | Cheuk et al. | 455/418 |
| 2014/0051443 | A1* | 2/2014 | Diachina et al. | 455/436 |
| 2014/0105010 | A1* | 4/2014 | Fang | 370/230 |
| 2014/0105227 | A1* | 4/2014 | Maheshwari et al. | 370/474 |
| 2014/0161100 | A1* | 6/2014 | Velde et al. | 370/331 |
| 2014/0254523 | A1* | 9/2014 | Chai et al. | 370/329 |
| 2014/0308951 | A1* | 10/2014 | Chang et al. | 455/423 |
| 2014/0334444 | A1* | 11/2014 | Sachs et al. | 370/331 |

OTHER PUBLICATIONS

3rd Generation Partnership Project, 3GPP TS 23.203 V11.5.0 (Mar. 2012), Technical Specification Group Services and System Aspects, "Policy and charging control architecture", (Release 11), 175 pages.

3rd Generation Partnership Project, 3GPP TS 23.107 V6.4.0 (Mar. 2006), Technical Specification Group Services and System Aspects, "Quality of Service (QoS) concept and architecture", (Release 6), 40 pages.

3rd Generation Partnership Project, 3GPP TS 23.401 V11.1.0 (Mar. 2012), Technical Specification Group Services and System Aspects, "General Packet Radio Service (GPRS) enhancements for Evolved Universal Terrestrial Radio Access Network (E-UTRAN) access", (Release 11), 284 pages.

3rd Generation Partnership Project, 3GPP TS 25.331 V11.1.0 (Mar. 2012). Technical Specification Group Radio Access Network "Radio Resource Control (RRC); Protocol specification" (Release 11). 1912 pages.

3rd Generation Partnership Project, 3GPP TS 25.304 V10.4.0 (Mar. 2012), Technical Specification Group Radio Access Network, "User Equipment (UE) procedures in idle mode and procedures for cell reselection in connected mode", (Release 10), 52 pages.

3rd Generation Partnership Project, 3GPP TS 36.331 V10.5.0 (Mar. 2012), Technical Specification Group Radio Access Network, "Evolved Universal Terrestrial Radio Access (E-UTRA); Radio Resource Control (RRC); Protocol specification", (Release 10), 302 pages.

3rd Generation Partnership Project, 3GPP TS 24.301 V11.2.1 (Mar. 2012), Technical Specification Group Core Network and Terminals, "Non-Access-Stratum (NAS) protocol for Evolved Packet System (EPS); Stage 3", (Release 11), 327 pages.

3rd Generation Partnership Project, 3GPP TS 24.008 V11.2.1 (Mar. 2012), Technical Specification Group Core Network and Terminals, "Mobile radio interface Layer 3 specification; Core network protocols; Stage 3", (Release 11), 659 pages.

Universal Mobile Telecommunications System (UMTS); User Equipment (UE) procedures in idle mode and procedures for cell reselection in connected mode (3GPP TS 25.304 version 10.3.0 Release 10), Technical Specification, European Telecommunications Standards Institute (ETSI), 650, Route Des Lucioles; F-06921 Sophia-Antipolis; France, vol. 3GPP RAN 2, No. V10.3.0, Jan. 1, 2012, XP014069368 (54 pages).

Universal Mobile Telecommunications System (UMTS); Radio Resource Control (RRC); Protocol specification (3GPP TS 25.331 version 10.6.0 Release 10), Technical Specification, European Telecommunications Standards Institute (ETSI), 650, Route Des Lucioles; F-06921 Sophia-Antipolis; France, vol. 3GPP CT 1, No. V10.5.0, Jan. 1, 2012, XP014069305 (1903 pages).

Digital cellular telecommunications system (Phase 2+); Universal Mobile Telecommunications System (UMTS); LTE; Mobile radio interface Layer 3 specification; Core network protocols; Stage 3 (3GPP TS 24.008 version 10.5.0 Release 10), Technical Specification, European Telecommunications Standards Institute (ETSI), 650, Route Des Lucioles; F-06921 Sophia-Antipolis; France, vol. 3GPP RAN 2, No. V10.6.0, Jan. 1, 2012, XP014069388 (646 pages).

LTE; Evolved Universal Terrestrial Radio Access (E-UTRA); Radio Resource Control (RRC); Protocol specification (3GPP TS 36.331 version 10.4.0 Release 10), Jan. 1, 2012, Technical Specification, European Telecommunications Standards Institute (ETSI), 650, Route Des Lucioles; F-06921 Sophia-Antipolis; France, XP014069614 (300 pages).

European Patent Office, "Extended European Search Report", issued in connection with European patent application No. 12166709.1, Aug. 9, 2012, (6 pages).

* cited by examiner

```
 1   -- **************************************************
 2   -- RRC CONNECTION REQUEST
 3   -- 
 4   -- **************************************************
 5   
 6   RRCConnectionRequest ::= SEQUENCE {
 7   -- TABULAR: Integrity protection shall not be performed on this message.
 8   -- User equipment IEs
 9       initialUE-Identity       InitialUE-Identity,
10       establishmentCause       EstablishmentCause,
11   -- protocolErrorIndicator is MD, but for compactness reasons no default value
12   -- has been assigned to it.
13       protocolErrorIndicator   ProtocolErrorIndicator,
14   -- Measurement IEs
15       measuredResultsOnRACH    MeasuredResultsOnRACH   OPTIONAL,
16   -- Non critical Extensions
17       v3d0NonCriticalExtensions SEQUENCE {
18          uESpecificBehaviourInformationIdle UESpecificBehaviourInformationIdle
19             OPTIONAL,
20   -- Reserved for future non critical extension
21          v4b0NonCriticalExtensions SEQUENCE {
22              accessStratumReleaseIndicator AccessStratumReleaseIndicator,
23              v590NonCriticalExtensions SEQUENCE {
24                  predefinedConfigStatusInfo BOOLEAN,
25                  v690NonCriticalExtensions SEQUENCE {
26                      ueCapabilityIndication ENUMERATED { hsdch, hsdch-edch } OPTIONAL,
27                      measuredResultsOnRACHinterFreq MeasuredResultsOnRACHinterFreq
28                          OPTIONAL,
29                      domainIndicator
30                      CHOICE {
31                          cs-domain SEQUENCE {
32                              csCallType ENUMERATED {speech, video, other, spare }
33                          },
34                          ps-domain NULL
```

FIG. 6A

```
35      }
36      v6b0NonCriticalExtensions        SEQUENCE {
37          mbmsSelectedServices          MBMS-SelectedServicesShort OPTIONAL,
38          v6e0NonCriticalExtensions     SEQUENCE {
39              supportForFDPCH           ENUMERATED { true } OPTIONAL,
40              -- Reserved for future non critical extension
41              RRCConnectionOptional ENUMERATED { true } OPTIONAL,
42              nonCriticalExtensions         SEQUENCE {} OPTIONAL
43          } OPTIONAL
44      } OPTIONAL
45  } OPTIONAL
46  } OPTIONAL
47  }
48
49
```

FIG. 6B

```
 1   -- **********************************************************
 2   --
 3   -- CELL UPDATE
 4   --
 5   -- **********************************************************
 6   CellUpdate ::= SEQUENCE {
 7       -- User equipment IEs
 8       u-RNTI U-RNTI,
 9       startList STARTList,
10       am-RLC-ErrorIndicationRb2-3or4 BOOLEAN,
11       am-RLC-ErrorIndicationRb5orAbove BOOLEAN,
12       cellUpdateCause CellUpdateCause,
13       -- TABULAR: RRC transaction identifier is nested in
14       --          FailureCauseWithProtErrTrId
15       failureCause FailureCauseWithProtErrTrId OPTIONAL,
16       rb-timer-indicator Rb-timer-indicator,
17       -- Measurement IEs
18       measuredResultsOnRACH MeasuredResultsOnRACH OPTIONAL,
19       laterNonCriticalExtensions SEQUENCE {
20           -- Container for additional R99 extensions
21           cellUpdate-r3-add-ext        BIT STRING OPTIONAL,
22           v590NonCriticalExtensions SEQUENCE {
23               establishmentCause       EstablishmentCause OPTIONAL,
24               v690NonCriticalExtensions SEQUENCE {
25                   cellUpdateCause-ext         CellUpdateCause-ext OPTIONAL,
26                   trafficVolumeIndicator      ENUMERATED { true } OPTIONAL,
27                   measuredResultsOnRACHinterFreq MeasuredResultsOnRACHinterFreq
28                                               OPTIONAL,
29                   reconfigurationStatusIndicator ENUMERATED { true } OPTIONAL,
30                   v6b0NonCriticalExtensions   SEQUENCE {
31                       mbmsSelectedServices    MBMS-SelectedServicesShort OPTIONAL,
32                       nonCriticalExtensions   SEQUENCE {} OPTIONAL,
33        902  ──▶    RadioAccessBearerOptional ENUMERATED { true } OPTIONAL,
34                   } OPTIONAL
35           } OPTIONAL
```

```
36    }
37    }  OPTIONAL
38    }  OPTIONAL
```

5.3.3 RRC connection establishment

*5.3.3.1 General*

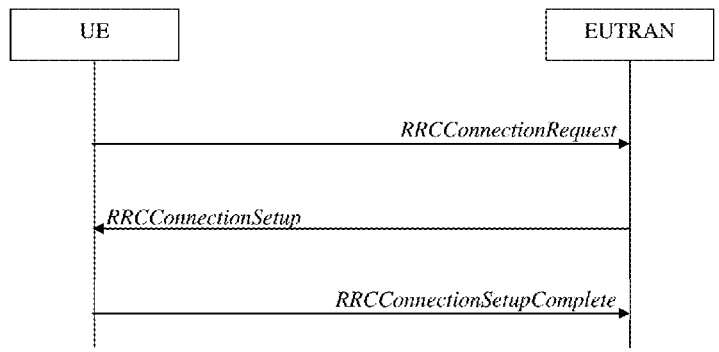

Figure 5.3.3.1-1: RRC connection establishment, successful

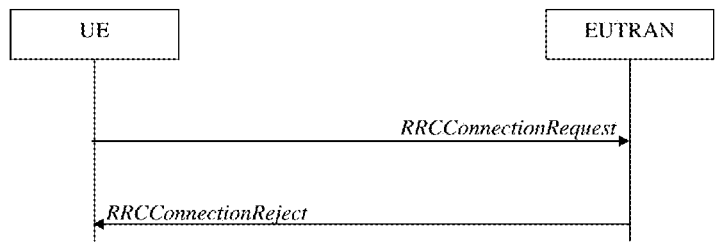

Figure 5.3.3.1-2: RRC connection establishment, network reject

The purpose of this procedure is to establish an RRC connection. [..].

*5.3.3.2 Initiation*

The UE initiates the procedure when upper layers request establishment of an RRC connection while the UE is in RRC_IDLE.

Upon initiation of the procedure, the UE shall:

1> [..]

1> start timer T300;

1> initiate transmission of the *RRCConnectionRequest* message in accordance with 5.3.3.3;

NOTE 2: Upon initiating the connection establishment procedure, the UE is not required to ensure it maintains up to date system information applicable only for UEs in RRC_IDLE state. However, the UE needs to perform system information acquisition upon cell re-selection.

FIG. 10A

*5.3.3.3 Actions related to transmission of RRCConnectionRequest message*
The UE shall set the contents of *RRCConnectionRequest* message as follows:

> 1> set the *ue-Identity* as follows:
>
>> 2> if upper layers provide an S-TMSI:
>>
>>> 3> set the *ue-Identity* to the value received from upper layers;
>>
>> 2> else:
>>
>>> 3> draw a random value in the range 0 .. $2^{40}$-1 and set the *ue-Identity* to this value;
>
> NOTE 1: Upper layers provide the S-TMSI if the UE is registered in the TA of the current cell.
>
> 1> set the *establishmentCause* in accordance with the information received from upper layers;
>
> 1> set the *trafficType* in accordance with the information received from upper layers.
>
> NOTE 2: Upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

The UE shall submit the *RRCConnectionRequest* message to lower layers for transmission.

[..]

5.3.3.8 Reception of the RRCConnectionReject *by the UE*
The UE shall:

> 1> stop timer T300;
>
> 1> reset MAC and release the MAC configuration;
>
> 1> start timer T302, with the timer value set to the *waitTime*;
>
> 1> if the *trafficType* in the *RRCConnectionRequest* message for which the *RRCConnectionRequest* is received, is set, and (the *extendedWaitTime* is not present or the UE does not supports delay tolerant access):
>
>> 2> inform upper layers about the failure to establish the RRC connection for the *trafficType* as indicated by the information received from upper layers, upon which the procedure ends;
>
> NOTE 1: The traffic type is set in accordance with information provided by upper layers, the upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.
>
> 1> if the *extendedWaitTime* is present and the UE supports delay tolerant access:
>
>> 2> forward the *extendedWaitTime* to upper layers;
>
> 1> inform upper layers about the failure to establish the RRC connection and that access barring for mobile originating calls, mobile originating signalling, mobile terminating access and mobile originating CS fallback is applicable, upon which the procedure ends;

8.1.3 RRC connection establishment

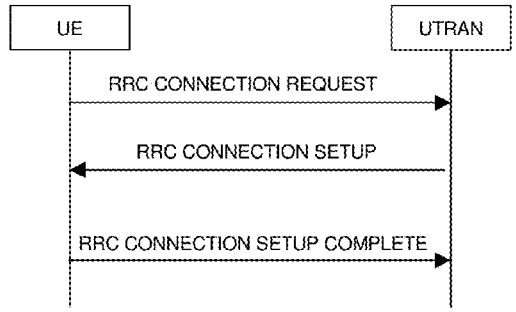

Figure 8.1.3-1: RRC Connection Establishment, network accepts RRC connection

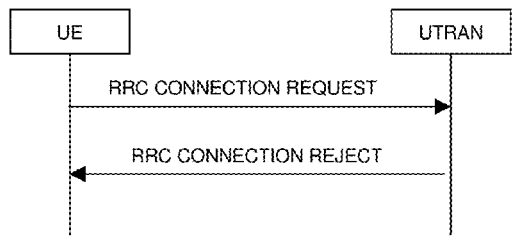

Figure 8.1.3-2: RRC Connection Establishment, network rejects RRC connection

*8.1.3.1 General*

The purpose of this procedure is to establish an RRC connection.

*8.1.3.2 Initiation*

The UE shall initiate the procedure when upper layers in the UE requests the establishment of a signalling connection and the UE is in idle mode (no RRC connection exists), as specified in subclause 8.1.8.

Upon initiation of the procedure, the UE shall:

1> [..]

1> set the IE "trafficType" in accordance with the information received from upper layers.

NOTE 2: Upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

1> set the contents of the RRC CONNECTION REQUEST message according to subclause 8.1.3.3;

1> submit the RRC CONNECTION REQUEST message for transmission on the uplink CCCH;

1> set counter V300 to 1; and

1> if the variable ESTABLISHMENT_CAUSE is set to "MBMS reception":

2> when the MAC layer indicates success or failure to transmit the message:

3> if the MAC layer indicates failure:

4> enter idle mode;

4> consider the procedure to be unsuccessful;

4> perform other actions when entering idle mode from connected mode as specified in subclause 8.5.2;

4> the procedure ends.

3> else:

4> start timer T318;

4> apply value 0 for counter N300 regardless of the value included in IE "UE Timers and Constants in idle mode".

1> otherwise:

2> start timer T300 when the MAC layer indicates success or failure to transmit the message.

1> [..].

8.1.3.3 RRC CONNECTION REQUEST message contents to set

The UE shall, in the transmitted RRC CONNECTION REQUEST message:

1> set the IE "Establishment cause" to the value of the variable ESTABLISHMENT_CAUSE;

1> set the IE "Initial UE identity" to the value of the variable INITIAL_UE_IDENTITY;

1> set the IE "Protocol error indicator" to the value of the variable PROTOCOL_ERROR_INDICATOR; and 1> include the IE "Predefined configuration status information" and set this IE to TRUE if the UE has all pre-configurations stored with the same value tag as broadcast in the cell in which the RRC connection establishment is initiated.

1> if the UE is attempting to establish the signalling connection to PS-domain:

2> include the IE "Domain Indicator" and set it to "PS domain".

3> set the IE "trafficType" in accordance with the information received from upper layers.

4> NOTE 2: Upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

1> else if the UE is attempting to establish the signalling connection to CS domain:

FIG. 10D

2> include the IE "Domain Indicator" and set it to "CS domain";

2> set the value of the IE "Call type" to "speech", "video" or "other" according to the call being initiated.

1> [..]

The UE shall not include the IE "UE Specific Behaviour Information 1 idle".

*8.1.3.9 Reception of an RRC CONNECTION REJECT message by the UE*
When the UE receives an RRC CONNECTION REJECT message on the downlink CCCH, it shall compare the value of the IE "Initial UE identity" in the received RRC CONNECTION REJECT message with the value of the variable INITIAL_UE_IDENTITY:

If the values are different, the UE shall ignore the rest of the message;

If the values are identical, the UE shall:

1> stop timer T300 or T318, whichever one is running; and

1> clear the entry for the RRC CONNECTION REJECT message in the table "Accepted transactions" in the variable TRANSACTIONS;

1> if the IE "trafficType" in the *RRCConnectionRequest* message for which the *RRCConnectionRequest* is received, is set, the *extendedWaitTime* is not present or the UE does not supports delay tolerant access:

2> inform upper layers about the failure to establish the RRC connection for the IE "trafficType" as indicated by the information received from upper layers, upon which the procedure ends;

NOTE 1: The traffic type is set in accordance with information provided by upper layers, the upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

1> if the UE has disabled cell reselection to a UTRA carrier due to an earlier RRC CONNECTION REJECT message, the UE shall resume cell reselection to that UTRA carrier;

1> if the Rejection Cause is 'unspecified' and the IE "Counting Completion" is present, the UE shall terminate an ongoing MBMS counting procedure according to subclause 8.7.4.4;

1> if the IE "wait time" <> '0'; and

1> if the IE "frequency info" is present and:

2> if V300 is equal to or smaller than N300:

3> select a suitable UTRA cell according to [4] on that frequency;

3> after having selected and camped on a suitable cell on the designated UTRA carrier:

4> set CFN in relation to SFN of current cell according to subclause 8.5.15;

4> set the contents of the RRC CONNECTION REQUEST message according to subclause 8.1.3.3;

4> perform the mapping of the Access Class to an Access Service Class as specified in subclause 8.5.13, and apply the given Access Service Class when accessing the RACH or the common E-DCH (for the Enhanced Uplink in CELL_FACH and Idle mode);

FIG. 10E

- 4> transmit an RRC CONNECTION REQUEST message on the uplink CCCH;
- 4> reset counter V300;
- 4> start timer T300 when the MAC layer indicates success or failure in transmitting the message;
- 4> disable cell reselection to original UTRA carrier until the time stated in the IE "wait time" has elapsed or until the RRC connection establishment procedure ends, whichever occurs first;
- 3> if no suitable cell on the designated UTRA carrier is found:
  - 4> wait for at least the time stated in the IE "wait time";
  - 4> set CFN in relation to SFN of current cell according to subclause 8.5.15;
  - 4> set the IEs in the RRC CONNECTION REQUEST message according to subclause 8.1.3.3;
  - 4> perform the mapping of the Access Class to an Access Service Class as specified in subclause 8.5.13, and apply the given Access Service Class when accessing the RACH or the common E-DCH (for the Enhanced Uplink in CELL_FACH and Idle mode);
  - 4> then submit a new RRC CONNECTION REQUEST message to the lower layers for transmission on the uplink CCCH of the original serving cell;
  - 4> increment counter V300;
  - 4> restart timer T300 when the MAC layer indicates success or failure to transmit the message;
- 2> if V300 is greater than N300:
  - 3> enter idle mode;
  - 3> perform the actions specified in subclause 8.5.2 when entering idle mode from connected mode:
  - 3> consider the RRC establishment procedure to be unsuccessful;
  - 3> the procedure ends.
- 1> if the IE "inter-RAT info" is present:
  - 2> if the IE "wait time" = '0':
    - 3> the UE behaviour is not specified.
  - 2> if V300 is equal to or smaller than N300:
    - 3> if the IE "GSM target cell info" is present:
      - 4> attempt to camp on a suitable cell of the list of cells indicated for that RAT;
      - 4> if the UE selects and camps on one of the cells indicated for that RAT:
        - 5> disable cell reselection to the original RAT until the time stated in the IE "wait time" has elapsed.
      - 4> if the UE cannot find any suitable cell from the indicated ones within 10s, the UE is allowed to camp on any suitable cell on that RAT.
        - 5> after having selected and camped on a suitable cell on the designated RAT:
          - 6> the UE may disable cell reselection to the original RAT until the time stated in the IE "wait time" has elapsed.

FIG. 10F

3> if the IE "E-UTRA target info" is present:

4> attempt to camp on a suitable cell on one of the frequencies indicated for that RAT, excluding any cell indicated in the list of not allowed cells for that RAT (i.e. the "blacklisted cells per freq list" for E-UTRA), if present;

4> if the UE selects and camps on one such cell:

5> disable cell reselection to the original RAT until the time stated in the IE "wait time" has elapsed.

4> if the UE cannot find any suitable cell on the indicated frequencies within 10s, the UE is allowed to camp on any suitable cell on that RAT:

5> after having selected and camped on a suitable cell on the designated RAT:

6> disable cell reselection to the original RAT until the time stated in the IE "wait time" has elapsed.

3> if neither the IE "GSM target cell info" nor the IE "E-UTRA target info" is present:

4> select a suitable cell in the designated RAT;

4> after having selected and camped on a suitable cell on the designated RAT:

5> disable cell reselection to the original RAT until the time stated in the IE "wait time" has elapsed or until the UE successfully establishes a connection on the designated RAT, whichever occurs first.

3> if no suitable cell in the designated RAT is found:

4> wait at least the time stated in the IE "wait time";

4> set CFN in relation to SFN of current cell according to subclause 8.5.15;

4> set the IEs in the RRC CONNECTION REQUEST message according to subclause 8.1.3.2.

4> perform the mapping of the Access Class to an Access Service Class as specified in subclause 8.5.13, and apply the given Access Service Class when accessing the RACH or the common E-DCH (for the Enhanced Uplink in CELL_FACH and Idle mode);

4> then submit a new RRC CONNECTION REQUEST message to the lower layers for transmission on the uplink CCCH;

4> increment counter V300;

4> restart timer T300 when the MAC layer indicates success or failure to transmit the message;

2> if V300 is greater than N300:

3> enter idle mode;

3> perform the actions specified in subclause 8.5.2 when entering idle mode from connected mode;

3> consider the RRC establishment procedure to be unsuccessful;

3> the procedure ends.

1> if the IE "wait time" <> '0'; and

1> if neither the IEs "frequency info" nor "inter-RAT info" are present:

FIG. 10G

2> if V300 is equal to or smaller than N300:

3> wait at least the time stated in the IE "wait time";

3> set the IEs in the RRC CONNECTION REQUEST message according to subclause 8.1.3.2;

3> perform the mapping of the Access Class to an Access Service Class as specified in subclause 8.5.13, and apply the given Access Service Class when accessing the RACH or the common E-DCH (for the Enhanced Uplink in CELL_FACH and Idle mode);

3> submit a new RRC CONNECTION REQUEST message to the lower layers for transmission on the uplink CCCH;

3> increment counter V300;

3> restart timer T300 when the MAC layer indicates success or failure to transmit the message;

2> if V300 is greater than N300:

3> enter idle mode;

3> perform the actions specified in subclause 8.5.2 when entering idle mode from connected mode;

3> consider the RRC establishment procedure to be unsuccessful;

3> the procedure ends.

1> if the IE "wait time" = '0':

2> if the IE "Extended Wait Time" is present and the UE supports "delay tolerant access":

3> forward the IE "Extended Wait Time" to the upper layers;

2> enter idle mode;

2> perform the actions specified in subclause 8.5.2 when entering idle mode from connected mode;

2> consider the RRC establishment procedure to be unsuccessful;

2> the procedure ends.

TS 25.331

8.3.1 Cell and URA update procedures

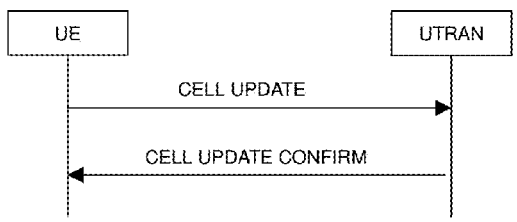

Figure 8.3.1-1: Cell update procedure, basic flow

FIG. 10H

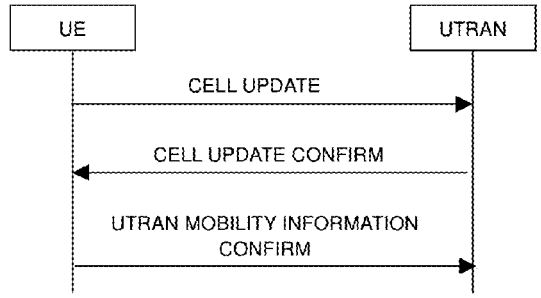
Figure 8.3.1-2: Cell update procedure with update of UTRAN mobility information
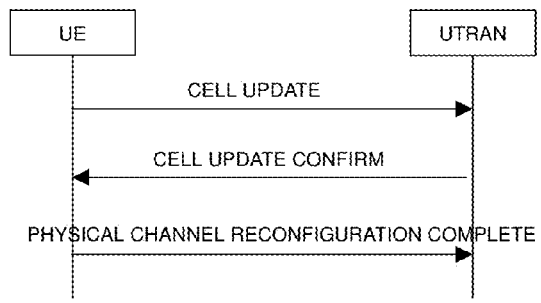
Figure 8.3.1-3: Cell update procedure with physical channel reconfiguration
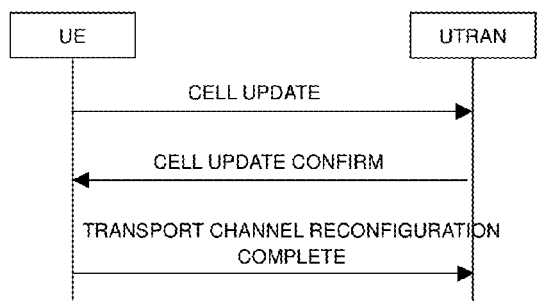
Figure 8.3.1-4: Cell update procedure with transport channel reconfiguration
FIG. 10I

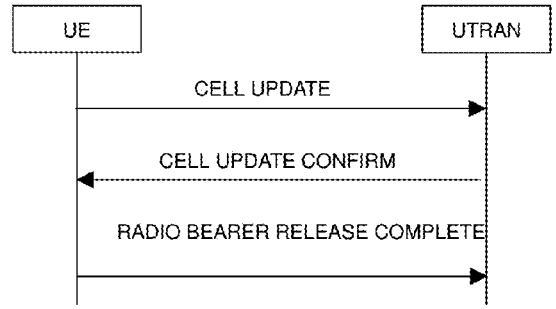
Figure 8.3.1-5: Cell update procedure with radio bearer release
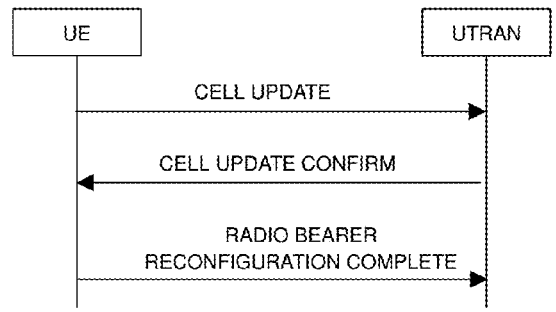
Figure 8.3.1-6: Cell update procedure with radio bearer reconfiguration
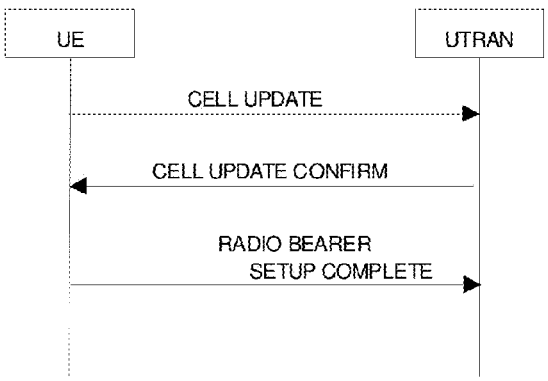
Figure 8.3.1-6a: Cell update procedure with radio bearer setup
FIG. 10J

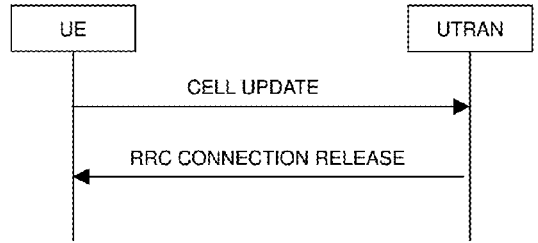

Figure 8.3.1-7: Cell update procedure, failure case

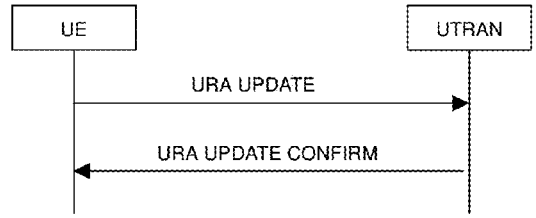

Figure 8.3.1-8: URA update procedure, basic flow

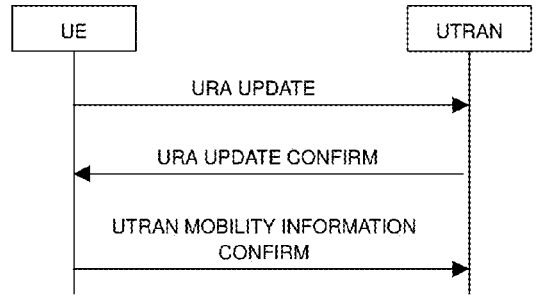

Figure 8.3.1-9: URA update procedure with update of UTRAN mobility information

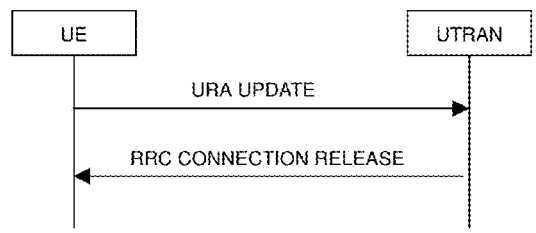

Figure 8.3.1-10: URA update procedure, failure case

*8.3.1.1 General*

The URA update and cell update procedures serve several main purposes:

- to notify UTRAN after re-entering service area in the URA_PCH or CELL_PCH state;
- to notify UTRAN of an RLC unrecoverable error [16] on an AM RLC entity;

FIG. 10K

- to be used as a supervision mechanism in the CELL_FACH, CELL_PCH, or URA_PCH state by means of periodical update.

In addition, the URA update procedure also serves the following purpose:

- to retrieve a new URA identity after cell re-selection to a cell not belonging to the current URA assigned to the UE in URA_PCH state.

In addition, the cell update procedure also serves the following purposes:

- to update UTRAN with the current cell the UE is camping on after cell reselection;
- to act on a radio link failure in the CELL_DCH state;
- to act on the transmission failure of the UE CAPABILITY INFORMATION message;
- for FDD and 1.28 Mcps TDD, if the variable H_RNTI is not set, and for 3.84 Mcps TDD and 7.68 Mcps TDD:
  when triggered in the URA_PCH or CELL_PCH state, to notify UTRAN of a transition to the CELL_FACH state due to the reception of UTRAN originated paging or due to a request to transmit uplink data;
- to count the number of UEs in URA_PCH, CELL_PCH and CELL_FACH that are interested to receive an MBMS transmission;
- when triggered in the URA_PCH, CELL_PCH and CELL_FACH state, to notify UTRAN of the UEs interest to receive an MBMS service;
- to request the MBMS P-T-P RB setup by the UE in CELL_PCH, URA_PCH and CELL_FACH state.

The URA update and cell update procedures may:

1> include an update of mobility related information in the UE;

1> indicate a change of the traffic type as indicated by the upper layers;

NOTE 2: Upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

1> cause a state transition from the CELL_FACH state to the CELL_DCH, CELL_PCH or URA_PCH states or idle mode.

The cell update procedure may also include:

- a re-establish of AM RLC entities;
- a re-establish of UM RLC entities;
- a radio bearer release, radio bearer reconfiguration, transport channel reconfiguration or physical channel reconfiguration.

8.3.1.2 Initiation
A UE shall initiate the cell update procedure in the following cases:

FIG. 10L

1> if applicable for the case, set the *trafficType* in accordance with the information if received from upper layers and as received from upper layers;

NOTE 2: Upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

1> Uplink data transmission:

2> for FDD and 1.28 Mcps TDD, if the variable H_RNTI is not set, and for 3.84 Mcps TDD and 7.68 Mcps TDD:

3> if the UE is in URA_PCH or CELL_PCH state; and

3> if timer T320 is not running:

4> if the UE has uplink RLC data PDU or uplink RLC control PDU on RB1 or upwards to transmit:

5> perform cell update using the cause "uplink data transmission".

3> else:

4> if the variable ESTABLISHMENT_CAUSE is set:

5> perform cell update using the cause "uplink data transmission".

1> Paging response:

2> if the criteria for performing cell update with the cause specified above in the current subclause are not met; and 2> if the UE in URA_PCH or CELL_PCH state, receives a PAGING TYPE 1 message fulfilling the conditions for initiating a cell update procedure specified in subclause 8.1.2.3:

3> perform cell update using the cause "paging response".

1> Radio link failure:

2> if none of the criteria for performing cell update with the causes specified above in the current subclause is met:

3> if the UE is in CELL_DCH state and the criteria for radio link failure are met as specified in subclause 8.5.6; or 3> if the transmission of the UE CAPABILITY INFORMATION message fails as specified in subclause 8.1.6.6; or 3> if the UE detects PDCP Unrecoverable Error [36] in a PDCP entity 4> perform cell update using the cause "radio link failure".

1> MBMS ptp RB request:

2> if none of the criteria for performing cell update with the causes specified above in the current subclause is met; and 2> if the UE is in URA_PCH, Cell_PCH or Cell_FACH state; and 2> if timer T320 is not running; and

FIG. 10M

2> if the UE should perform cell update for MBMS ptp radio bearer request as specified in subclause 8.6.9.6:

3> perform cell update using the cause "MBMS ptp RB request".

1> Re-entering service area:

2> if none of the criteria for performing cell update with the causes specified above in the current subclause is met; and 2> if the UE is in CELL_FACH or CELL_PCH state; and 2> if the UE has been out of service area and re-enters service area before T307 or T317 expires:

3> perform cell update using the cause "re-entering service area".

1> RLC unrecoverable error:

2> if none of the criteria for performing cell update with the causes specified above in the current subclause is met; and 2> if the UE detects RLC unrecoverable error [16] in an AM RLC entity:

3> perform cell update using the cause "RLC unrecoverable error".

1> Cell reselection:

2> if none of the criteria for performing cell update with the causes specified above in the current subclause is met:

3> if the UE is in CELL_FACH or CELL_PCH state and the UE performs cell re-selection; or 3> if the UE is in CELL_FACH state and the variable C_RNTI is empty:

4> perform cell update using the cause "cell reselection".

1> Periodical cell update:

2> if none of the criteria for performing cell update with the causes specified above in the current subclause is met; and 2> if the UE is in CELL_FACH or CELL_PCH state; and 2> if the timer T305 expires; and 2> if the criteria for "in service area" as specified in subclause 8.5.5.2 are fulfilled; and 2> if periodic updating has been configured by T305 in the IE "UE Timers and constants in connected mode" set to any other value than "infinity":

3> for FDD:

4> if the variable COMMON_E_DCH_TRANSMISSION is set to FALSE:

5> perform cell update using the cause "periodical cell update".

4> else:

5> restart the timer T305;

5> and end the procedure.

3> for 1.28 Mcps TDD and 3.84/7.68 Mcps TDD:

FIG. 10N

4> perform cell update using the cause "periodical cell update".

1> MBMS reception:

2> if none of the criteria for performing cell update with the causes specified above in the current subclause is met; and 2> if the UE is in URA_PCH, Cell_PCH or Cell_FACH state; and 2> if the UE should perform cell update for MBMS counting as specified in subclause 8.7.4:

3> perform cell update using the cause "MBMS reception".

A UE in URA_PCH state shall initiate the URA update procedure in the following cases:

1> URA reselection:

2> if the UE detects that the current URA assigned to the UE, stored in the variable URA_IDENTITY, is not present in the list of URA identities in system information block type 2; or 2> if the list of URA identities in system information block type 2 is empty; or 2> if the system information block type 2 can not be found:

3> perform URA update using the cause "change of URA".

1> Periodic URA update:

2> if the criteria for performing URA update with the causes as specified above in the current subclause are not met:

3> if the timer T305 expires and if periodic updating has been configured by T305 in the IE "UE Timers and constants in connected mode" set to any other value than "infinity"; or 3> if the conditions for initiating an URA update procedure specified in subclause 8.1.1.6.5 are fullfilled:

4> perform URA update using the cause "periodic URA update".

When initiating the URA update or cell update procedure, the UE shall:

1> if timer T320 is running:

2> stop timer T320;

2> if the UE has uplink RLC data PDU or uplink RLC control PDU on RB1 or upwards to transmit:

3> perform cell update using the cause "uplink data transmission".

2> else:

3> if the cell update procedure is not triggered due to Paging response or Radio link failure; and 3> if the UE should perform cell update for MBMS ptp radio bearer request as specified in subclause 8.6.9.6:

4> perform cell update using the cause "MBMS ptp RB request".

1> stop timer T319 if it is running;

1> stop timer T305;

FIG. 10O

1> for FDD and 1.28 Mcps TDD:

2> if the UE is in CELL_FACH state; and

2> if the IE "HS-DSCH common system information" is included in System Information Block type 5 or System Information Block type 5bis; and 2> for 1.28 Mcps TDD, if IE "Common E-DCH system info" in System Information Block type 5; and 2> if the UE does support HS-DSCH reception in CELL_FACH state:

3> if variable H_RNTI is not set or variable C_RNTI is not set; or

3> for FDD, an unrecoverable error [16] in any of the AM RLC entities for the signalling radio bearers RB2, RB3 or RB4 is detected:

4> clear variable H_RNTI;

4> clear variable C_RNTI;

4> clear any stored IEs "HARQ info";

4> set variable HS_DSCH_RECEPTION_OF_CCCH_ENABLED to TRUE;

4> and start receiving the HS-DSCH transport channels mapped physical channel(s) of type HS-SCCH and HS-PDSCH, by using parameters given by the IE(s) "HS-DSCH common system information" according to the procedure in subclause 8.5.37.

3> else:

4> receive the HS-DSCH transport channels mapped physical channel(s) of type HS-SCCH and HS-PDSCH, by using parameters given by the IE(s) "HS-DSCH common system information" according to the procedure in subclause 8.5.36;

4> determine the value for the HSPA_RNTI_STORED_CELL_PCH variable and take the corresponding actions as described in subclause 8.5.56;

4> determine the value for the READY_FOR_COMMON_EDCH variable and take the corresponding actions as described in subclause 8.5.47;

4> determine the value for the COMMON_E_DCH_TRANSMISSION variable and take the corresponding actions as described in subclause 8.5.46;

4> if variable READY_FOR_COMMON_EDCH is set to TRUE:

5> configure the Enhanced Uplink in CELL_FACH state and Idle mode as specified in subclause 8.5.45 for FDD and 8.5.45a for 1.28 Mcps TDD.

1> if the UE is in CELL_DCH state:

2> in the variable RB_TIMER_INDICATOR, set the IE "T314 expired" and the IE "T315 expired" to FALSE;

2> if the stored values of the timer T314 and timer T315 are both equal to zero; or 2> if the stored value of the timer T314 is equal to zero and there are no radio bearers associated with any radio access bearers for which in the variable ESTABLISHED_RABS the value of the IE "Re-establishment timer" is set to "useT315" and signalling connection exists only to the CS domain:

3> release all its radio resources;

FIG. 10P

3> indicate release (abort) of the established signalling connections (as stored in the variable ESTABLISHED_SIGNALLING_CONNECTIONS) and established radio access bearers (as stored in the variable ESTABLISHED_RABS) to upper layers;

3> clear the variable ESTABLISHED_SIGNALLING_CONNECTIONS;

3> clear the variable ESTABLISHED_RABS;

3> enter idle mode;

3> perform other actions when entering idle mode from connected mode as specified in subclause 8.5.2;

3> and the procedure ends.

2> if the stored value of the timer T314 is equal to zero:

3> release all radio bearers, associated with any radio access bearers for which in the variable ESTABLISHED_RABS the value of the IE "Re-establishment timer" is set to "useT314";

3> in the variable RB_TIMER_INDICATOR set the IE "T314 expired" to TRUE;

3> if all radio access bearers associated with a CN domain are released:

4> release the signalling connection for that CN domain;

4> remove the signalling connection for that CN domain from the variable ESTABLISHED_SIGNALLING_CONNECTIONS;

4> indicate release (abort) of the signalling connection to upper layers;

2> if the stored value of the timer T315 is equal to zero:

3> release all radio bearers associated with any radio access bearers for which in the variable ESTABLISHED_RABS the value of the IE "Re-establishment timer" is set to "useT315";

3> in the variable RB_TIMER_INDICATOR set the IE "T315 expired" to TRUE.

3> if all radio access bearers associated with a CN domain are released:

4> release the signalling connection for that CN domain;

4> remove the signalling connection for that CN domain from the variable ESTABLISHED_SIGNALLING_CONNECTIONS;

4> indicate release (abort) of the signalling connection to upper layers;

2> if the stored value of the timer T314 is greater than zero:

3> if there are radio bearers associated with any radio access bearers for which in the variable ESTABLISHED_RABS the value of the IE "Re-establishment timer" is set to "useT314":

4> start timer T314.

3> if there are no radio bearers associated with any radio access bearers for which in the variable ESTABLISHED_RABS the value of the IE "Re-establishment timer" is set to "useT314" or "useT315" and the signalling connection exists to the CS domain:

4> start timer T314.

2> if the stored value of the timer T315 is greater than zero:

FIG. 10Q

3> if there are radio bearers associated with any radio access bearers for which in the variable ESTABLISHED_RABS the value of the IE "Re-establishment timer" is set to "useT315"; or 3> if the signalling connection exists to the PS domain:

4> start timer T315.

2> for the released radio bearer(s):

3> delete the information about the radio bearer from the variable ESTABLISHED_RABS;

3> when all radio bearers belonging to the same radio access bearer have been released:

4> indicate local end release of the radio access bearer to upper layers using the CN domain identity together with the RAB identity stored in the variable ESTABLISHED_RABS;

4> delete all information about the radio access bearer from the variable ESTABLISHED_RABS.

2> if the variable E_DCH_TRANSMISSION is set to TRUE:

3> set the variable E_DCH_TRANSMISSION to FALSE;

3> stop any E-AGCH and E-HICH reception procedures;

3> for FDD, stop any E-RGCH reception procedures.

3> for FDD, stop any E-DPCCH and E-DPDCH transmission procedures.

3> for 1.28 Mcps TDD, stop any E-PUCH transmission procedure.

3> clear the variable E_RNTI;

3> act as if the IE "MAC-es/e reset indicator" was received and set to TRUE;

3> release all E-DCH HARQ resources;

3> no longer consider any radio link to be the serving E-DCH radio link.

2> move to CELL_FACH state;

2> select a suitable UTRA cell on the current frequency according to [4];

2> clear variable E_RNTI and:

3> determine the value for the HSPA_RNTI_STORED_CELL_PCH variable and take the corresponding actions as described in subclause 8.5.56;

3> determine the value for the READY_FOR_COMMON_EDCH variable and take the corresponding actions as described in subclause 8.5.47;

3> determine the value for the COMMON_E_DCH_TRANSMISSION variable and take the corresponding actions as described in subclause 8.5.46.

2> for 3.84 Mcps TDD and 7.68Mcps TDD; or

2> for FDD and 1.28 Mcps TDD, if the UE does not support HS-DSCH reception in CELL_FACH state; or 2> if the IE "HS-DSCH common system information" is not included in System Information Block type 5 or System Information Block type 5bis; or 2> for 1.28 Mcps TDD, if the IE "Common E-DCH system info" is not included in System Information Block type 5:

FIG. 10R

- 3> select PRACH according to subclause 8.5.17;
- 3> select Secondary CCPCH according to subclause 8.5.19;
- 3> use the transport format set given in system information as specified in subclause 8.6.5.1;
- 3> take the actions related to the HS_DSCH_RECEPTION_GENERAL variable as described in subclause 8.5.37a.
- 2> else:
  - 3> if variable READY_FOR_COMMON_EDCH is set to TRUE:
    - 4> configure the Enhanced Uplink in CELL_FACH state and Idle mode as specified in subclause 8.5.45.
  - 3> else:
    - 4> select PRACH according to subclause 8.5.17 and:
      - 5> use for the PRACH the transport format set given in system information as specified in subclause 8.6.5.1.
  - 3> clear variable H_RNTI;
  - 3> clear any stored IEs "HARQ info";
  - 3> reset the MAC-ehs entity [15];
  - 3> set variable HS_DSCH_RECEPTION_OF_CCCH_ENABLED to TRUE;
  - 3> and start receiving the HS-DSCH according to the procedure in subclause 8.5.37.
- 2> set the variable ORDERED_RECONFIGURATION to FALSE.
- 1> set the variables PROTOCOL_ERROR_INDICATOR, FAILURE_INDICATOR, UNSUPPORTED_CONFIGURATION and INVALID_CONFIGURATION to FALSE;
- 1> set the variable CELL_UPDATE_STARTED to TRUE;
- 1> if any IEs releated to HS-DSCHare stored in the UE:
  - 2> clear any stored IE "Downlink HS-PDSCH information";
  - 2> clear any stored IE "Downlink Secondary Cell Info FDD";
  - 2> clear all the entries from the variable TARGET_CELL_PRECONFIGURATION;
  - 2> for 1.28Mcps TDD, clear the IE "HS-PDSCH Midamble Configuration" and the IE "HS-SCCH Set Configuration" in the IE "DL Multi Carrier Information";
  - 2> determine the value for the HS_DSCH_RECEPTION variable and take the corresponding actions as described in subclause 8.5.25;
  - 2> determine the value for the SECONDARY_CELL_HS_DSCH_RECEPTION variable and take the corresponding actions as described in subclause 8.5.51.
- 1> if any IEs related to E-DCH are stored in the UE:
  - 2> clear any stored IE "E-DCH info";

FIG. 10S

2> for FDD, clear any stored IE "Secondary serving E-DCH cell info" and IE "Secondary E-DCH info common";

2> for 1.28Mcps TDD, clear any stored IE "Multi-carrier E-DCH Info for LCR TDD";

2> determine the value for the E_DCH_TRANSMISSION variable and take the corresponding actions as described in subclause 8.5.28.

1> if any of the IEs "DTX-DRX timing information" or "DTX-DRX information" are stored in the UE:

2> determine the value for the DTX_DRX_STATUS variable and take the corresponding actions as described in subclause 8.5.34.

1> if the IE "HS-SCCH less information" is stored in the UE:

2> determine the value for the HS_SCCH_LESS_STATUS variable and take the corresponding actions as described in subclause 8.5.35.

1> if any IEs related to MIMO are stored in the UE:

2> determine the value for the MIMO_STATUS variable and take the corresponding actions as described in subclause 8.5.33.

1> for 1.28 Mcps TDD, if the IEs "Control Channel DRX Information" is stored in the UE:

2> determine the value for the CONTROL_CHANNEL_DRX_STATUS variable and take the corresponding actions as described in subclause 8.5.53.

1> for 1.28 Mcps TDD, if the IE "SPS information" is stored in the UE:

2> determine the value for the E_DCH_SPS_STATUS variable and take the corresponding actions as described in subclause 8.5.54;

2> determine the value for the HS_DSCH_SPS_STATUS variable and take the corresponding actions as described in subclause 8.5.55.

1> for 1.28 Mcps TDD, if the IE "MU-MIMO info" is stored in the UE:

2> determine the value for the MU_MIMO_STATUS variable and take the corresponding actions as described in subclause 8.5.61.

1> if the UE is not already in CELL_FACH state:

2> move to CELL_FACH state;

2> determine the value for the HSPA_RNTI_STORED_CELL_PCH variable and take the corresponding actions as described in subclause 8.5.56;

2> determine the value for the READY_FOR_COMMON_EDCH variable and take the corresponding actions as described in subclause 8.5.47;

2> determine the value for the COMMON_E_DCH_TRANSMISSION variable and take the corresponding actions as described in subclause 8.5.46;

2> for 1.28 Mcps TDD, determine the value for the MU_MIMO_STATUS variable and take the corresponding actions as described in subclause 8.5.61;

2> for 3.84 Mcps TDD and 7.68 Mcps TDD; or

2> for FDD and 1.28 Mcps TDD, if the UE does not support HS-DSCH reception in CELL_FACH state; or

FIG. 10T

2> if the IE "HS-DSCH common system information" is not included in System Information Block type 5 or System Information Block type 5bis; or 2> for 1.28 Mcps TDD, if the IE "Common E-DCH system info" is not included in System Information Block type 5:

3> select PRACH according to subclause 8.5.17;

3> select Secondary CCPCH according to subclause 8.5.19;

3> use the transport format set given in system information as specified in subclause 8.6.5.1;

3> take the actions related to the HS_DSCH_RECEPTION_GENERAL variable as described in subclause 8.5.37a.

2> else:

3> if variable READY_FOR_COMMON_EDCH is set to TRUE:

4> configure the Enhanced Uplink in CELL_FACH state and Idle mode as specified in subclause 8.5.45.

3> else:

4> select PRACH according to subclause 8.5.17 and:

5> use for the PRACH the transport format set given in system information as specified in subclause 8.6.5.1.

3> if variable H_RNTI is not set or variable C_RNTI is not set:

4> clear variable C_RNTI;

4> clear variable H_RNTI;

4> clear any stored IEs "HARQ info";

4> set variable HS_DSCH_RECEPTION_OF_CCCH_ENABLED to TRUE;

4> and start receiving the HS-DSCH according to the procedure in subclause 8.5.37.

3> else:

4> receive the HS-DSCH according to the procedure in subclause 8.5.36.

1> if the UE performs cell re-selection:

2> clear the variable C_RNTI; and

2> stop using that C_RNTI just cleared from the variable C_RNTI in MAC;

2> for FDD and 1.28 Mcps TDD, if the variable H_RNTI is set:

3> clear the variable H_RNTI; and

3> stop using that H_RNTI just cleared from the variable H_RNTI in MAC;

3> clear any stored IEs "HARQ info";

2> for FDD and 1.28 Mcps TDD, if the variable E_RNTI is set:

3> clear the variable E_RNTI.

FIG. 10U

2> determine the value for the HSPA_RNTI_STORED_CELL_PCH variable and take the corresponding actions as described in subclause 8.5.56;

2> determine the value for the READY_FOR_COMMON_EDCH variable and take the corresponding actions as described in subclause 8.5.47;

2> determine the value for the COMMON_E_DCH_TRANSMISSION variable and take the corresponding actions as described in subclause 8.5.46;

2> for FDD and 1.28 Mcps TDD, if the UE does support HS-DSCH reception in CELL_FACH state and IE "HS-DSCH common system information" is included in System Information Block type 5 or System Information Block type 5bis:

3> reset the MAC-ehs entity [15].

3> set variable HS_DSCH_RECEPTION_OF_CCCH_ENABLED to TRUE;

3> and start receiving the HS-DSCH according to the procedure in subclause 8.5.37.

2> else:

3> take the actions related to the HS_DSCH_RECEPTION_GENERAL variable as described in subclause 8.5.37a.

1> set CFN in relation to SFN of current cell according to subclause 8.5.15;

1> in case of a cell update procedure:

2> set the contents of the CELL UPDATE message according to subclause 8.3.1.3;

2> submit the CELL UPDATE message for transmission on the uplink CCCH.

1> in case of a URA update procedure:

2> set the contents of the URA UPDATE message according to subclause 8.3.1.3;

2> submit the URA UPDATE message for transmission on the uplink CCCH.

1> set counter V302 to 1;

1> start timer T302 when the MAC layer indicates success or failure in transmitting the message.

8.3.1.3 CELL UPDATE / URA UPDATE message contents to set

In case of cell update procedure the UE shall transmit a CELL UPDATE message.

In case of URA update procedure the UE shall transmit a URA UPDATE message.

The UE shall set the IEs in the CELL UPDATE message as follows:

1> set the *trafficType* in accordance with the information if received from upper layers and as received from upper layers;

NOTE 2: Upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

1> set the IE "Cell update cause" corresponding to the cause specified in subclause 8.3.1.2 that is valid when the CELL UPDATE message is submitted to lower layers for transmission;

FIG. 10V

NOTE: During the time period starting from when a cell update procedure is initiated by the UE until when the procedure ends, additional CELL UPDATE messages may be transmitted by the UE with different causes.

1> if the IE "Cell update cause" is set to "uplink data transmission" and if an event triggered traffic volume measurement has been configured:

2> if the TCTV is larger than the threshold in the IE "Reporting threshold" for a traffic volume measurement stored in the MEASUREMENT_IDENTITY variable and that traffic volume measurement has "measurement identity" equal to 4, "Traffic volume event identity" equal to "4a", "Measurement validity" equal to "all states" or "all states except CELL_DCH":

3> set the IE "Traffic volume indicator" to TRUE.

2> else:

3> set the IE "Traffic volume indicator" to FALSE.

1> set the IE "U-RNTI" to the value of the variable U_RNTI;

1> if the value of the variable PROTOCOL_ERROR_INDICATOR is TRUE:

2> include the IE "RRC transaction identifier"; and

3> set it to the value of "RRC transaction identifier" in the entry for the CELL UPDATE CONFIRM message in the table "Rejected transactions" in the variable TRANSACTIONS.

2> include and set the IE "failure cause" to the cause value "protocol error";

2> set the IE "Protocol error information" set to the value of the variable PROTOCOL_ERROR_INFORMATION.

1> if the value of the variable FAILURE_INDICATOR is TRUE:

2> include the IE "RRC transaction identifier"; and

3> set it to the value of "RRC transaction identifier" in the entry for the CELL UPDATE CONFIRM message in the table "Accepted transactions" in the variable TRANSACTIONS.

2> include and set the IE "failure cause" to the value of the variable FAILURE_CAUSE.

1> if the variable "LATEST_CONFIGURED_CN_DOMAIN" has been initialised:

2> for each CN domain for which an entry exists in the variable ESTABLISHED_RABS or which is indicated in the variable LATEST CONFIGURED CN DOMAIN:

3> include the START value calculated according to subclause 8.5.9.

1> else:

2> include the START value for either the CS domain or the PS domain, calculated according to subclause 8.5.9.

1> if an unrecoverable error [16] in any of the AM RLC entities for the signalling radio bearers RB2, RB3 or RB4 is detected:

2> set the IE "AM_RLC error indication (RB2, RB3 or RB4)" to TRUE;

2> set the variable AM_RLC_ERROR_PENDING_RB234 to TRUE.

1> otherwise:

FIG. 10W

2> if the value of the variable AM_RLC_ERROR_PENDING_RB234 is TRUE:

3> set the IE "AM_RLC error indication (RB2, RB3 or RB4)" to TRUE.

2> otherwise:

3> set the IE "AM_RLC error indication (RB2, RB3 or RB4)" to FALSE.

1> if an unrecoverable error [16] in any of the AM RLC entities for the RB5 or upward is detected:

2> set the IE "AM_RLC error indication (RB>4)" to TRUE;

2> set the variable AM_RLC_ERROR_PENDING_RB5_AND_UP to TRUE.

1> otherwise:

2> if the value of the variable AM_RLC_ERROR_PENDING_RB5_AND_UP is TRUE:

3> set the IE "AM_RLC error indication (RB>4)" to TRUE.

2> otherwise:

3> set the IE "AM_RLC error indication (RB>4)" to FALSE.

1> set the IE "RB Timer indicator" to the value of the variable RB_TIMER_INDICATOR;

1> if the variable ESTABLISHMENT_CAUSE is initialised:

2> include the IE "Establishment cause" and set it to the value of the variable ESTABLISHMENT_CAUSE;

2> if the value of the variable ESTABLISHMENT_CAUSE is set to "Originating Conversational Call" or "Emergency Call" and a CS call is being initiated:

3> set the value of the IE "Call type" to "speech", "video" or "other" according to the call being initiated.

1> if the variable ORDERED_RECONFIGURATION is set to TRUE:

2> include the IE "Reconfiguration Status Indicator" and set it to TRUE.

1> if the IE "Cell update cause" is set to "radio link failure" or "RLC Unrecoverable error" and the UE has submitted a reconfiguration response message to RLC and the UE has not received the RLC acknowledgement for the response message:

2> include the IE "Reconfiguration Status Indicator" and set it to TRUE.

1> if the UE supports HS-DSCH reception in CELL_FACH state:

2> include the IE "HS-PDSCH in CELL_FACH" and set it to TRUE.

1> if the UE supports Enhanced Uplink in CELL_FACH state and Idle mode:

2> include the IE "Support of common E-DCH" and set it to TRUE.

1> if the UE has reverted back old security configuration by aborting ongoing security mode command as cell update procedure was initiated:

2> include the IE "Security Revert Status Indicator" and set it to "Reverted Back".

1> otherwise:

2> include the IE "Security Revert Status Indicator" and set it to "Normal Operation".

FIG. 10X

1> if the UE supports Two DRX schemes in URA_PCH and CELL_PCH

2> include the IE "Support for Two DRX schemes in URA_PCH and CELL_PCH" and set it to TRUE.

NOTE: In 1.28 Mcps TDD, UE supporting HS-DSCH reception in CELL_FACH state always supports Enhanced Uplink in CELL_FACH state and Idle mode, and vice versa.

1> if the UE supports MAC-i/is:

2> include the IE "Support of MAC-i/is" and set it to TRUE.

1> if the UE supports HS-DSCH DRX operation in CELL_FACH state:

2> include the IE "Support of HS-DSCH DRX operation" and set it to TRUE.

1> if the UE supports SPS operation:

2> include the IE "Support of SPS operation" and set it to TRUE.

1> if the UE supports control channel DRX operation:

2> include the IE "Support of control channel DRX operation" and set it to TRUE.

1> if the UE performs cell update for MBMS ptp radio bearer request as specified in subclause 8.6.9.6; and 1> if one or more of the MBMS services for which the UE initiates the ptp radio bearer request concerns an MBMS Selected Service:

2> for each MBMS Selected Service that is indicated on MCCH and for which the UE initiates ptp radio bearer request:

3> order the MBMS Selected Services such that those selected with a higher priority are listed in the IE "MBMS Selected Services Short" before those selected with a lower priority;

3> include the IE "MBMS Selected Service ID" within the IE "MBMS Selected Services Short" and set it to a value in accordance with subclause 8.6.9.8.

1> otherwise, if the UE performs cell update for MBMS counting as specified in subclause 8.7.4; and 1> if one or more of the MBMS services for which the UE initiates the counting response concerns an MBMS Selected Service:

2> for each MBMS Selected Service that is indicated on MCCH and for which the UE initiates the counting response:

3> order the MBMS Selected Services such that those selected with a higher priority are listed in the IE "MBMS Selected Services Short" before those selected with a lower priority;

3> include the IE "MBMS Selected Service ID" within the IE "MBMS Selected Services Short" and set it to a value in accordance with subclause 8.6.9.8.

1> if the UE included one or more "MBMS Selected Service ID" IEs:

2> include the IE "MBMS Modification Period identity" and set it to a value in accordance with subclause 8.5.29.

1> if, according to [4], the High-mobility state is applicable and it has been detected by the UE:

2> include the IE "UE Mobility State Indicator" and set it to the "High-MobilityDetected" value.

FIG. 10Y

1> if an IE "Logged Measurement Info-FDD" or "Logged Measurement Info-TDD" in variable LOGGED_MEAS_REPORT_VARIABLE is present and registered PLMN is the same as the IE "PLMN Identity" stored in variable LOGGED_MEAS_REPORT_VARIABLE:

2> include IE "Logged Meas Available".

1> if an IE "Logged ANR Report Info" in variable LOG_ANR_REPORT_VARIABLE is present and the registered PLMN is the same as one of the PLMNs in the IE "PLMN Identity" or IE "Equivalent PLMN Identity List" stored in variable LOG_ANR_REPORT_VARIABLE:

2> include IE "ANR Logging Results Available".

The UE shall:

1> if the UE capability has changed compared to the value stored in the variable UE_CAPABILITY_TRANSFERRED and the variable RNC_CAPABILITY_CHANGE_SUPPORT is set to TRUE:

2> include the IE "Capability change indicator".

NOTE: Transmitting the IE "Capability change indicator" does not trigger any actual changed behaviour on the part of the UE. It serves only to inform the network that the UE is requesting an opportunity to send a UE CAPABILITY INFORMATION message.

The UE shall set the IEs in the URA UPDATE message as follows:

1> set the IE "U-RNTI" to the value of the variable U_RNTI;

1> set the IE "URA update cause" corresponding to which cause as specified in subclause 8.3.1.2 that is valid when the URA UPDATE message is submitted to lower layers for transmission;

NOTE: During the time period starting from when a URA update procedure is initiated by the UE until when the procedure ends, additional URA UPDATE messages may be transmitted by the UE with different causes, depending on which causes are valid for the respective URA UPDATE message.

1> if the value of the variable PROTOCOL_ERROR_INDICATOR is TRUE:

2> include the IE "RRC transaction identifier"; and

3> set it to the value of "RRC transaction identifier" in the entry for the URA UPDATE CONFIRM message in the table "Rejected transactions" in the variable TRANSACTIONS.

2> set the IE "Protocol error indicator" to TRUE;

2> include the IE "Protocol error information" set to the value of the variable PROTOCOL_ERROR_INFORMATION.

1> if the value of the variable PROTOCOL_ERROR_INDICATOR is FALSE:

2> if the value of the variable INVALID_CONFIGURATION is TRUE:

3> include the IE "RRC transaction identifier"; and

3> set it to the value of "RRC transaction identifier" in the entry for the URA UPDATE CONFIRM message in the table "Accepted transactions" in the variable TRANSACTIONS;

3> set the IE "Protocol error indicator" to TRUE;

3> include the IE "Protocol error information" set to "Information element value not comprehended".

FIG. 10Z

2> if the value of the variable INVALID_CONFIGURATION is FALSE:

3> set the IE "Protocol error indicator" to FALSE.

1> if the UE supports HS-DSCH reception in CELL_FACH state:

2> include the IE "HS-PDSCH in CELL_FACH" and set it to TRUE.

1> if the UE supports HS-DSCH reception CELL_PCH and URA_PCH state:

2> include the IE "HS-PDSCH in CELL_PCH and URA_PCH" and set it to TRUE.

1> if the UE supports Enhanced Uplink in CELL_FACH state and Idle mode:

2> include the IE "Support of common E-DCH" and set it to TRUE.

1> if an IE "Logged Measurement Info-FDD" or "Logged Measurement Info-TDD" in variable LOGGED_MEAS_REPORT_VARIABLE is present and registered PLMN is the same as the IE "PLMN Identity" stored in variable LOGGED_MEAS_REPORT_VARIABLE:

2> include IE "Logged Meas Available".

1> if IE "Logged ANR report" in variable LOG_ANR_REPORT_VARIABLE is present and registered PLMN is the same as one of the PLMNs in the IE "PLMN Identity" or IE "Equivalent PLMN Identity List" stored in variable LOG_ANR_REPORT_VARIABLE:

2> include IE "ANR Logging Results Available".

*8.3.1.5 Reception of an CELL UPDATE/URA UPDATE message by the UTRAN*

When the UTRAN receives a CELL UPDATE/URA UPDATE message, the UTRAN should:

1> in case the procedure was triggered by reception of a CELL UPDATE:

2> if SRNS relocation was performed:

3> transmit a CELL UPDATE CONFIRM message on the downlink DCCH.

2> otherwise:

3> update the START value for each CN domain as maintained in UTRAN (refer to subclause 8.5.9) with "START" in the IE "START list" for the CN domain as indicated by "CN domain identity" in the IE "START list";

3> transmit a CELL UPDATE CONFIRM message on the downlink DCCH or optionally on the CCCH but only if ciphering is not required; and 3> optionally set the IE "RLC re-establish indicator (RB2, RB3 and RB4)" and/or the IE "RLC re-establish indicator (RB5 and upwards)" to TRUE to request a RLC re-establishment in the UE, in which case the corresponding RLC entities should also be re-established in UTRAN; or 1> in case the procedure was triggered by reception of a URA UPDATE:

2> if SRNS relocation was performed:

3> transmit a URA UPDATE CONFIRM message on the downlink DCCH.

2> otherwise:

3> transmit a URA UPDATE CONFIRM message on the downlink CCCH or DCCH.

FIG. 10AA

2> include the IE "URA identity" in the URA UPDATE CONFIRM message in a cell where multiple URA identifiers are broadcast; or 1> initiate an RRC connection release procedure (see subclause 8.1.4) by transmitting an RRC CONNECTION RELEASE message on the downlink CCCH. In particular UTRAN should:

2> if the CELL UPDATE message was sent because of an unrecoverable error in RB2, RB3 or RB4:

3> initiate an RRC connection release procedure (subclause 8.1.4) by transmitting an RRC CONNECTION RELEASE message on the downlink CCCH.

1> if the radio bearer is connected to a CS domain radio access bearer and the radio bearer uses UM RLC:

2> the UM RLC entity should be re-established in UTRAN.

UTRAN may transmit several CELL UPDATE CONFIRM/URA UPDATE CONFIRM messages to increase the probability of proper reception of the message by the UE. In such a case, the RRC SN for these repeated messages should be the same.

8.3.2  URA update

See subclause 8.3.1.

*ANNEX A: text that may need changing*

TS 36.300. This should reflect Solution #4".

---

11  Scheduling and Rate Control

In order to utilise the SCH resources efficiently, a scheduling function is used in MAC. In this subclause, an overview of the scheduler is given in terms of scheduler operation, signalling of scheduler decisions, and measurements to support scheduler operation.

11.1  Basic Scheduler Operation

MAC in eNB includes dynamic resource schedulers that allocate physical layer resources for the DL-SCH and UL-SCH transport channels. Different schedulers operate for the DL-SCH and UL-SCH.

The scheduler should take account of the traffic volume and the QoS requirements of each UE and associated radio bearers, when sharing resources between UEs. Only "per UE" grants are used to grant the right to transmit on the UL-SCH (i.e. there are no "per UE per RB" grants).

Schedulers may assign resources taking account the radio conditions at the UE identified through measurements made at the eNB and/or reported by the UE.

FIG. 10BB

Radio resource allocations can be valid for one or multiple TTIs.

Resource assignment consists of physical resource blocks (PRB) and MCS. Allocations for time periods longer than one TTI might also require additional information (allocation time, allocation repetition factor...).

When CA is configured, a UE may be scheduled over multiple serving cells simultaneously but at most one random access procedure shall be ongoing at any time. Cross-carrier scheduling with the Carrier Indicator Field (CIF) allows the PDCCH of a serving cell to schedule resources on another serving cell but with the following restrictions:

- Cross-carrier scheduling does not apply to PCell i.e. PCell is always scheduled via its PDCCH;
- When the PDCCH of an SCell is configured, cross-carrier scheduling does not apply to this SCell i.e. it is always scheduled via its PDCCH;
- When the PDCCH of an SCell is not configured, cross-carrier scheduling applies and this SCell is always scheduled via the PDCCH of one other serving cell.

A linking between UL and DL allows identifying the serving cell for which the DL assignment or UL grant applies when the CIF is not present:

- DL assignment received on PCell corresponds to downlink transmission on PCell;
- UL grant received on PCell corresponds to uplink transmission on PCell;
- DL assignment received on $SCell_n$ corresponds to downlink transmission on $SCell_n$;
- UL grant received on $SCell_n$ corresponds to uplink transmission on $SCell_n$. If $SCell_n$ is not configured for uplink usage by the UE, the grant is ignored by the UE.

11.1.1 Downlink Scheduling

In the downlink, E-UTRAN can dynamically allocate resources (PRBs and MCS) to UEs at each TTI via the C-RNTI on PDCCH(s). A UE always monitors the PDCCH(s) in order to find possible allocation when its downlink reception is enabled (activity governed by DRX when configured). When CA is configured, the same C-RNTI applies to all serving cells.

In addition, E-UTRAN can allocate semi-persistent downlink resources for the first HARQ transmissions to UEs:

- RRC defines the periodicity of the semi-persistent downlink grant;
- PDCCH indicates whether the downlink grant is a semi-persistent one i.e. whether it can be implicitly reused in the following TTIs according to the periodicity defined by RRC.

When required, retransmissions are explicitly signalled via the PDCCH(s). In the sub-frames where the UE has semi-persistent downlink resource, if the UE cannot find its C-RNTI on the PDCCH(s), a downlink transmission according to the semi-persistent allocation that the UE has been assigned in the TTI is assumed. Otherwise, in the sub-frames where the UE has semi-persistent downlink resource, if the UE

FIG. 10CC finds its C-RNTI on the PDCCH(s), the PDCCH allocation overrides the semi-persistent allocation for that TTI and the UE does not decode the semi-persistent resources.

When CA is configured, semi-persistent downlink resources can only be configured for the PCell and only PDCCH allocations for the PCell can override the semi-persistent allocation.

11.1.2 Uplink Scheduling

In the uplink, E-UTRAN can dynamically allocate resources (PRBs and MCS) to UEs at each TTI via the C-RNTI on PDCCH(s). A UE always monitors the PDCCH(s) in order to find possible allocation for uplink transmission when its downlink reception is enabled (activity governed by DRX when configured). When CA is configured, the same C-RNTI applies to all serving cells.

In addition, E-UTRAN can allocate a semi-persistent uplink resource for the first HARQ transmissions and potentially retransmissions to UEs:

- RRC defines the periodicity of the semi-persistent uplink grant;
- PDCCH indicates whether the uplink grant is a semi-persistent one i.e. whether it can be implicitly reused in the following TTIs according to the periodicity defined by RRC.

In the sub-frames where the UE has semi-persistent uplink resource, if the UE cannot find its C-RNTI on the PDCCH(s), an uplink transmission according to the semi-persistent allocation that the UE has been assigned in the TTI can be made. The network performs decoding of the pre-defined PRBs according to the pre-defined MCS. Otherwise, in the sub-frames where the UE has semi-persistent uplink resource, if the UE finds its C-RNTI on the PDCCH(s), the PDCCH allocation overrides the persistent allocation for that TTI and the UE's transmission follows the PDCCH allocation, not the semi-persistent allocation. Retransmissions are either implicitly allocated in which case the UE uses the semi-persistent uplink allocation, or explicitly allocated via PDCCH(s) in which case the UE does not follow the semi-persistent allocation.

> NOTE: there is no blind decoding in uplink and when the UE does not have enough data to fill the allocated resource, padding is used.

When the UE is provided with valid uplink grants in several serving cells in one TTI, the order in which the grants are processed during logical channel prioritisation and whether joint or serial processing is applied are left up to UE implementation.

Similarly as for the downlink, semi-persistent uplink resources can only be configured for the PCell and only PDCCH allocations for the PCell can override the semi-persistent allocation.

11.2 Activation/Deactivation Mechanism

To enable reasonable UE battery consumption when CA is configured, an activation/deactivation mechanism of SCells is supported (i.e. activation/deactivation does not apply to PCell). When an SCell is deactivated, the UE does not need to receive the corresponding PDCCH or PDSCH, cannot transmit in the corresponding uplink, nor is it required to perform CQI measurements. Conversely, when an SCell is

FIG. 10DD active, the UE shall receive PDSCH and PDCCH (if the UE is configured to monitor PDCCH from this SCell), and is expected to be able to perform CQI measurements.

The activation/deactivation mechanism is based on the combination of a MAC control element and deactivation timers. The MAC control element carries a bitmap for the activation and deactivation of SCells: a bit set to 1 denotes activation of the corresponding SCell, while a bit set to 0 denotes deactivation. With the bitmap, SCells can be activated and deactivated individually, and a single activation/deactivation command can activate/deactivate a subset of the SCells. One deactivation timer is maintained per SCell but one common value is configured per UE by RRC.

At reconfiguration without mobility control information:

- SCells added to the set of serving cells are initially "deactivated";
- SCells which remain in the set of serving cells (either unchanged or reconfigured) do not change their activation status ("activated" or "deactivated").

At reconfiguration with mobility control information (i.e. handover):

- SCells are "deactivated".

11.3  Measurements to Support Scheduler Operation

Measurement reports are required to enable the scheduler to operate in both uplink and downlink. These include transport volume and measurements of a UEs radio environment.

Uplink buffer status reports (BSR) are needed to provide support for QoS-aware packet scheduling. In E-UTRAN uplink buffer status reports refer to the data that is buffered in for a group of logical channel (LCG) in the UE. Four LCGs and two formats are used for reporting in uplink:

- A short format for which only one BSR (of one LCG) is reported;
- A long format for which all four BSRs (of all four LCGs) are reported.

Uplink buffer status reports are transmitted using MAC signalling.

11.4  Rate Control of GBR, MBR and UE-AMBR

11.4.1  Downlink

The eNB guarantees the downlink GBR associated with a GBR bearer, enforces the downlink MBR associated with a GBR bearer and enforces the downlink AMBR associated with a group of Non-GBR bearers.

11.4.2  Uplink

The UE has an uplink rate control function which manages the sharing of uplink resources between radio bearers. RRC controls the uplink rate control function by giving each bearer a priority and a prioritised bit rate (PBR). The values signalled may not be related to the ones signalled via S1 to the eNB.

FIG. 10EE

The uplink rate control function ensures that the UE serves its radio bearer(s) in the following sequence:

1. All the radio bearer(s) in decreasing priority order up to their PBR;
2. All the radio bearer(s) in decreasing priority order for the remaining resources assigned by the grant.

NOTE1: In case the PBRs are all set to zero, the first step is skipped and the radio bearer(s) are served in strict priority order: the UE maximises the transmission of higher priority data.

NOTE2: By limiting the total grant to the UE, the eNB can ensure that the UE-AMBR plus the sum of MBRs is not exceeded.

NOTE3: Provided the higher layers are responsive to congestion indications, the eNB can enforce the MBR of an uplink radio bearer by triggering congestion indications towards higher layers and by shaping the data rate towards the S1 interface.

If more than one radio bearer has the same priority, the UE shall serve these radio bearers equally.

11.5 CQI reporting for Scheduling

The time and frequency resources used by the UE to report CQI are under the control of the eNB. CQI reporting can be either periodic or aperiodic. A UE can be configured to have both periodic and aperiodic reporting at the same time. In case both periodic and aperiodic reporting occurs in the same subframe, only the aperiodic report is transmitted in that subframe.

For efficient support of localized, distributed and MIMO transmissions, E-UTRA supports three types of CQI reporting:

- Wideband type: providing channel quality information of entire system bandwidth of the cell;
- Multi-band type: providing channel quality information of some subset(s) of system bandwidth of the cell;
- MIMO type: open loop or closed loop operation (with or without PMI feedback).

Periodic CQI reporting is defined by the following characteristics:

- When the UE is allocated PUSCH resources in a subframe where a periodic CQI report is configured to be sent, the periodic CQI report is transmitted together with uplink data on the PUSCH. Otherwise, the periodic CQI reports are sent on the PUCCH.

Aperiodic CQI reporting is defined by the following characteristics:

- The report is scheduled by the eNB via the PDCCH;
- Transmitted together with uplink data on PUSCH.

When a CQI report is transmitted together with uplink data on PUSCH, it is multiplexed with the transport block by L1 (i.e. the CQI report is not part of the uplink the transport block).

The eNB configures a set of sizes and formats of the reports. Size and format of the report depends on whether it is transmitted over PUCCH or PUSCH and whether it is a periodic or aperiodic CQI report.

FIG. 10FF 11.6 Explicit Congestion Notification

The eNB and the UE support of the Explicit Congestion Notification (ECN) is specified in Section 5 of [35] (i.e., the normative part of [35] that applies to the end-to-end flow of IP packets), and below. This enables the eNB to control the initial codec rate selection and/or to trigger a codec rate reduction. Thereby the eNB can increase capacity (e.g., in terms of number of accepted VoIP calls), and improve coverage (e.g. for high bit rate video sessions).

The eNB should set the Congestion Experienced (CE) codepoint ('11') in PDCP SDUs in the downlink direction to indicate downlink (radio) congestion if those PDCP SDUs have one of the two ECN-Capable Transport (ECT) codepoints set. The eNB should set the Congestion Experienced (CE) codepoint ('11') in PDCP SDUs in the uplink direction to indicate uplink (radio) congestion if those PDCP SDUs have one of the two ECN-Capable Transport (ECT) codepoints set.

FIG. 10GG

PROVISIONING RADIO RESOURCES IN A RADIO ACCESS NETWORK

TECHNICAL FIELD

This disclosure pertains to wireless communication systems, and in particular to provisioning of radio resources, such as radio resource connections or radio access bearers for carrying user-plane data, in a radio access network.

BACKGROUND

In a radio access network, such as a 2G, 3G or Long-Term Evolution (LTE) network, a user equipment (UE), such as a smartphone, laptop computer, tablet computer, or the like, may execute one or more applications. The one or more applications reside in a application layer or an upper layer of the UE. The UE applications may generate data, referred to as user-plane data, that is often ultimately destined, via uplink, for a server associated with the UE-based application, or to another destination. A Radio Resource Control (RRC) Connection may be needed for carrying the user-plane data over a radio access network (e.g. Universal Terrestrial Radio Access Network (UTRAN), evolved UMTS Terrestrial Radio Access Network (E-UTRAN), or GSM EDGE Radio Access Network (GERAN)) toward its destination, and possibly in return from the destination to the UE. Radio resource control involves, in one aspect, the establishment, configuration, and/or release of radio access bearers in a wireless network.

User-plane data may be generated by an application in response to user interaction with the application at the UE. This is referred to herein as user-initiated user-plane data (UIUPD). Because a user is likely to be paying attention to the application, the user-plane data may be referred to as "attended" user-plane data. For example, when the application is a web browser, the selection or clicking of a hyperlink by a user may cause the application to generate a Hypertext Transfer Protocol (HTTP) GET message comprising a uniform resource locator (URL) (also known as a uniform resource identifier (URI)) of the desired web page. That message is a form of user-initiated user-plane data.

Alternatively, a UE-based application may generate user-plane data automatically, e.g. in the absence of user interaction with the application for at least a predetermined time period. This is referred to herein as non-user-initiated user-plane data (NUIUPD). For example, applications such as Gmail™, Twitter™, or Facebook™, or other social networking applications, may periodically generate an auto-update message, with a view to maintaining relatively fresh data at the UE application. Such auto-update messages are examples of non-user-initiated user-plane data. Because the user is unlikely to be paying attention to the application, the user-plane data in this case may be referred to as "unattended" user-plane data. The default interval between successive auto-update messages may differ among applications (e.g. it may be 20 minutes for Gmail™, 30 minutes for Twitter™, and 60 minutes for Facebook™). Another example of non-user-initiated user-plane data messages are keep-alive/ping transmissions that are triggered by "always-on" applications, which may utilize an always-on packet data protocol (PDP) context for data exchange with their respective push servers. The UE may use the keep-alive or ping mechanism to prevent the PDP context from being closed by the network. In some cases, non-user-initiated user-plane data messages may be generated by an application while the user interacts with other applications at the UE.

In another example, an application presenting a map at a moving UE 20 may generate an auto-update message, e.g. whenever the application determines that it needs to fetch new map information due to the movement of the UE 20. This can be considered as sensor-initiated user-plane data, as typically the request is generated in response to receiving input from a sensor, such as a GPS sensor in the case of a request to fetch new mapping data because a change in location of the UE has been detected. In this case, the urgency of response may be greater than in the social networking application example, because a user may actually be watching, or depending upon the currency of, the display map data. Therefore, the user-plane data in this case may also be referred to as "attended" user-plane data despite being non-user-initiated.

It is further possible for a non-user-initiated user-plane data message to be generated by an application and then, shortly thereafter, for a user-initiated user-plane data message to be generated, possibly by the same application or by a different application.

BRIEF DESCRIPTION OF THE DRAWINGS

FIGS. 6A and 6B illustrate an exemplary definition for a RRC Connection Request message that may be sent from the AS to the RAN of FIG. 1;

FIGS. 9A and 9B illustrate an exemplary definition for a Cell Update message that may be sent from the AS to the RAN of FIG. 1; and FIGS. 10A-10GG illustrate further aspects of the present disclosure.

DETAILED DESCRIPTION

Figure 1:
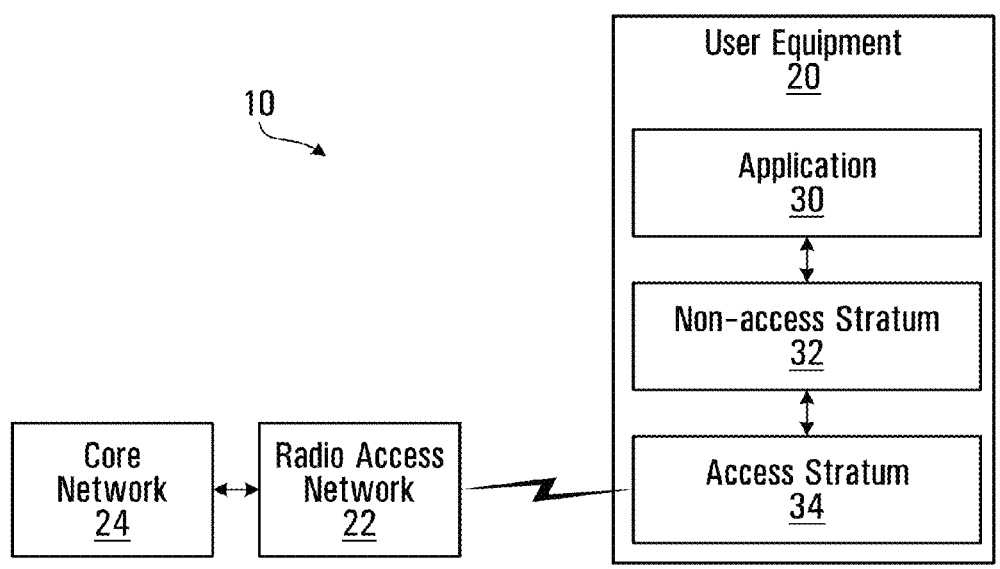
FIG. 1 is a schematic diagram of an exemplary embodiment system comprising a user equipment (UE) and a radio access network (RAN)

The embodiments set forth below represent the necessary information to enable those skilled in the art to practice the claimed subject matter and illustrate the best mode of practicing such subject matter. Upon reading the following description in light of the accompanying figures, those skilled in the art will understand the concepts of the claimed subject matter and will recognize applications of these concepts not particularly addressed herein. It should be understood that these concepts and applications fall within the scope of the disclosure and the accompanying claims.

Moreover, it will be appreciated that any module, component, or device exemplified herein that executes instructions may include or otherwise have access to computer readable storage medium or media for storage of information, such as machine or computer readable instructions, data structures, program modules, or other data. A non-exhaustive list of examples of computer readable storage media include magnetic cassettes, magnetic tape, magnetic disk storage or other magnetic storage devices, optical disks such as CD-ROM, digital versatile disks (DVD) or other optical storage, volatile and non-volatile, removable and non-removable media implemented in any method or technology, Random Access Memory (RAM), Read-Only Memory (ROM), Electrically Erasable Programmable Read-Only Memory (EEPROM), flash memory or other memory technology. Any such computer storage media may be part of the device or accessible or connectable thereto. Any application or module herein described may be implemented using computer readable/executable instructions that may be stored or otherwise held by such computer readable storage media.

In this document, the term "exemplary" is understood to mean "an example of" and does not necessarily connote that the example is preferred or exceptional in any way.

Regarding terminology, the provisioning of radio resources is considered to include, but not be limited to, the provisioning of a radio resource control (RRC) connection and/or the provisioning of radio access bearer (whether for an existing RRC connection or otherwise) for carrying user-plane data. The provisioning of an RRC connection may be initiated by, or may include, the sending of a radio resource control (RRC) Connection Request message for the purpose of requesting an RRC Connection from a RAN. The RRC Connection Request message is considered a form of "radio resource request message." If the RRC Connection Request is granted, a radio access bearer may, in at least some cases, be inherently provided. Alternatively, a radio access bearer may be subsequently provided in response to a Radio Bearer Setup message. The provisioning of a radio access bearer may be initiated by, or may include, the sending of a Cell Update message (another form of "radio resource request message") in respect of an existing RRC connection. When this form of radio resource request message is granted, a radio access bearer is provided. After a radio resource request message has been sent, receipt of a response to the request at the UE, which response is neither a rejection nor indicates an error, may be referred to as a successful handling of the radio resource request message.

In overview, when an application at a UE generates user-plane data, the UE may send a radio resource request message (e.g. a request to establish an RRC connection and radio access bearer, or a request for a radio access bearer when an RRC connection already exists) prior to sending the data via uplink, and possibly for receiving data as well. An optionality indicator may be provided along with the radio resource request message. The optionality indicator may indicate whether the UE considers successful handling of the radio resource request message to be optional or discretionary (e.g. if provisioning of an RRC connection is requested using the request message, the provisioning of the RRC connection by the RAN can be considered optional or discretionary based on, say, a current degree of RAN congestion, with provisioning being less likely when the RAN is congested than when it is uncongested, at the discretion of the RAN or a RAN element).

A UE may consider successful handling of a radio resource request message (e.g. provision of an RRC connection or provision of a radio access bearer for an existing RRC connection) to be optional when a user is unlikely to be actively awaiting a response to the generated user-plane data. This may be true, e.g., for certain types of non-user-initiated user-plane data (e.g. periodic social networking application auto-update request messages) that have been generated due to a lack of user input to the application over a predetermined time period and are likely to indicate user distraction or absence. Conversely, a UE may not consider successful handling of a radio resource request message (e.g. provision of an RRC connection or provision of a radio access bearer for an existing RRC connection) to be optional in other situations. One such situation may be when the generated user-plane data is user-initiated. In that case, a user is likely to be actively awaiting a response within a reasonable time period (e.g. on the order of seconds rather than tens of seconds, as a non-limiting example). Another situation in which an application may not consider successful handling of a radio resource request message to be optional is when the nature of the application is such that relatively prompt response is needed even though the user-plane data may not be user-initiated. For example, applications in which displayed data may potentially become outdated quickly, such as mapping applications on UEs that could potentially move quickly and risk leaving a user with outdated information regarding the user's current location, may not consider successful handling of a radio resource request message to be optional.

When an optionality indicator indicates that successful handling of a radio resource request message (e.g. provision of an RRC connection or provision of a radio access bearer in respect of an existing RRC connection) is optional or discretionary, e.g. the radio resource request message may be discarded, rejected or delayed. In contrast, when an optionality indicator is provided and indicates that successful handling of a radio resource request message is not optional or discretionary, or when no optionality indicator is provided, requests for an RRC Connection may be honored, accepted or granted. In the result, when a radio access network (RAN) is experiencing congestion, certain user-plane data traffic (e.g. user-initiated traffic or certain types of non-user-initiated traffic, e.g. mapping application data) for which successful handling of a radio resource request message has not been deemed optional may be given differential or preferential treatment relative to other types of non-user-initiated user-plane data traffic for which successful handling of a radio resource request message has been deemed optional. As such, users of UEs in a RAN that is experiencing congestion who are, say, actively interacting with their applications, may experience superior, or at least acceptable, responsiveness, i.e. relatively low latency in response to their user inputs, compared to that experienced at certain other types of UE applications whose user-plane data is non-user-initiated and does not require prompt response (e.g. when a lack of a prompt response may well go unnoticed by the user of the UE or the user of the application).

The radio access network may receive a radio resource request message with an optionality indicator, the optionality indicating that successful handling of a radio resources related request message is optional or discretionary. A radio access network may prefer to reject, or not even respond at all, to said request. A radio access network may decide to reject or not respond based upon many factors including, but not limited to, the current load or degree of congestion at the radio access network. In the case that the load is a factor and the load at the radio access network or at the receiving RAN element is approaching or has exceeded a predetermined threshold, the RAN or RAN element may decide to reject or not respond to radio resource request message with optionality indicator. A possible advantage is some embodiments is that more resources in the network may be made available for radio resource request messages without an optionality indicator or for radio resource request messages with an optionality indicator, the optionality indicating that successful handling of a radio resources related request message is not optional or not discretionary. In many cases, a user at the UE may not even notice that RAN did not handle the radio resource request message with the optionality indicator. Furthermore, the network may include a wait time timer value in a rejection response to the request. The wait time in the response message, when received at the UE, may cause the UE to start a timer that has been set to the timer value and back off any further requests with the optionality indicator, the optionality indicating that successful handling of a radio resources related request message is optional or discretionary, while the timer is not cleared, not stopped, or running. If a timer value is not provided in the response received at the UE, the UE may start a timer that has been set to a value, the value stored at the UE 20, for a similar purpose.

In this document, the RRC Connection Request message is considered a non-limiting example of radio resource request message. In addition, achieving the requested effect is considered successful handling of a radio resource request message. The receipt of a response message to the request message at the UE where the response message is neither indicating a rejection nor indicating an error, can comprise a successful handling.

In one aspect, there is provided a method at a user equipment (UE), the method comprising: determining that a timer is running, the timer indicating that a Radio Resource Control (RRC) Connection optionally to be provided was not provided by a radio access network (RAN); while the timer is running, sending a request for an RRC Connection to the RAN; and upon determining that the requested RRC Connection has been provided, clearing the timer.

In some embodiments sending the request comprises sending an RRC Connection Request message comprising an information element indicating that the provision of the requested RRC Connection is not optional. In other embodiments sending the request comprises sending an RRC Connection Request message, substantially absent of an information element indicating that the provision of the new RRC Connection is not optional.

In some embodiments the RRC Connection optionally to be provided was requested by sending an RRC Connection Request message comprising an information element indicating that provision of the RRC Connection optionally to be provided is optional.

In some embodiments the determining that the requested RRC Connection has been provided comprises receiving an RRC Connection Setup message at the UE. In other embodiments determining that the new RRC Connection has been provided comprises sending of an RRC Connection Setup Complete message by the UE.

In some embodiments the timer is maintained in the NAS layer of the UE.

In some embodiments the timer is maintained in the AS layer of the UE.

In another aspect, there is provided a method at a user equipment (UE), the method comprising: sending a first request for a first Radio Resource Control (RRC) Connection, the first request comprising an indicator indicating that provision of the RRC Connection is optional; upon receiving an indication that the first RRC Connection was not provided, starting a timer; while the timer is running, sending a second request for a second RRC Connection, the second request comprising an indicator indicating that provision of the RRC Connection is not optional; and upon receiving an indication that the second RRC Connection was provided, clearing the timer.

In some embodiments the indication that the first RRC Connection was not provided comprises receipt of a rejection of the first request.

In some embodiments the rejection is an RRC Connection Reject message.

In some embodiments the indication that the first RRC Connection was not provided comprises an absence of a response to the first request within a predetermined time period.

In another aspect, there is provided a user equipment (UE) comprising a processor operable to: determine that a timer is running, the timer indicating that a Radio Resource Control (RRC) Connection optionally to be provided was not provided by a radio access network (RAN); while the timer is running, send a request for an RRC Connection to the RAN; and upon determining that the requested RRC Connection has been provided, clear the timer.

In some embodiments the sending of the request comprises sending an RRC Connection Request message comprising an information element indicating that the provision of the requested RRC Connection is not optional.

In some embodiments the requesting of the RRC Connection optionally to be provided comprises sending an RRC Connection Request message comprise an information element indicating that provision of the RRC Connection optionally to be provided is optional.

In some embodiments the determining that the requested RRC Connection has been provided comprises receiving an RRC Connection Setup message at the UE.

In another aspect, there is provided a user equipment (UE) comprising a processor operable to: send a first request for a first Radio Resource Control (RRC) Connection, the first request comprising an indicator indicating that provision of the RRC Connection is optional; upon receiving an indication that the first RRC Connection was not provided, start a timer; while the timer is running, send a second request for a second RRC Connection, the second request comprising an indicator indicating that provision of the RRC Connection is not optional; and upon receiving an indication that the second RRC Connection was provided, clear the timer.

In some embodiments the indication that the first RRC Connection was not provided comprises receipt of an express rejection of the first request.

In some embodiments the express rejection is an RRC Connection Reject message.

In some embodiments the indication that the first RRC Connection was not provided comprises an absence of any response to the first request within a predetermined time period.

In another aspect, there is provided a machine-readable medium storing instructions that, upon execution of a processor at a user equipment (UE), causes the UE to: determine that a timer is running, the timer indicating that a Radio Resource Control (RRC) Connection optionally to be provided was not provided by a radio access network (RAN); while the timer is running, send a request for an RRC Connection to the RAN; and upon determining that the requested RRC Connection has been provided, clear the timer.

In another aspect, there is provided a machine-readable medium storing instructions that, upon execution of a processor at a user equipment (UE), causes the UE to: send a first request for a first Radio Resource Control (RRC) Connection, the first request comprising an indicator indicating that provision of the RRC Connection is optional; upon receiving an indication that the first RRC Connection was not provided, start a timer; while the timer is running, send a second request for a second RRC Connection, the second request comprising an indicator indicating that provision of the RRC Connection is not optional; and upon receiving an indication that the second RRC Connection was provided, clear the timer.

In another aspect, there is provided a method at a user equipment (UE), the method comprising: sending a first type of request for a Radio Resource Control (RRC) Connection, the first type of request indicating that provision of the RRC Connection is optional; receiving an indication that the RRC Connection was not provided in response to the first type of request; in response to the indication that the RRC connection was not provided, not sending a further first type of request for a time period.

In some embodiments, the time period is a predetermined time period.

In some embodiments, the method may further comprise sending a second type of request for a RRC Connection after the sending of the first type of request, the second type of request indicating that provision of the RRC Connection is not optional; and upon receiving an indication that the RRC Connection was provided in response to the second type of request, the UE ignoring any of the time period remaining.

In some embodiments, in response to the indication that the RRC connection was not provided, the UE starts a timer to measure the time period.

In some embodiments, in response to the indication that the RRC connection was not provided in response to the first type of request, the UE starts a timer to monitor the time period and the UE ignores any of the remaining time period by clearing the timer.

Referring to FIG. 1, an example embodiment of a system 10 is illustrated. The system comprises a user equipment (UE) 20, a radio access network (RAN) 22, and a core network (CN) 24. The UE 20 is a computing device, such as a smartphone, laptop computer, tablet computer, or the like, comprising three layers: an application 20, non-access stratum (NAS) 32, and an access stratum (AS) 34. The application may be any application that generates user-plane data of any kind, such as instant messaging client, social networking application, or any other application. That is, the term NAS refers to the protocol layers and associated functions that terminate within the UE and the CN (e.g. Mobility Management (MM), GPRS MM (GMM), EPS MM (EMM), Session Management (SM), EPS SM (ESM), or Call Control (CC) protocols). The NAS 32 provides signalling for core network mobility and attachment control. The term AS refers to the protocol layers (and associated functions) that terminate within the UE and the RAN (e.g. Layer 1 (L1), Medium Access Control (MAC), Radio Link Control (RLC), Packet Data Convergence Protocol (PDCP), and Radio Resource Control (RRC) protocols). The AS 34 provides for low-level signalling, including radio resource control and radio bearer establishment, between the UE and the RAN 22. As will be appreciated, the below-described operation of the NAS 32 and AS 34, in conjunction with the below-described operation of the RAN 22, may promote differential treatment of certain types of "unattended" non-user-initiated user-plane (NUIUPD) data versus user-initiated user-plane data (UIUPD). The operation of the application 30, NAS 32 and AS 34 may be based on software, hardware, firmware, and combinations thereof. The software may be loaded from a machine-readable medium (e.g. optical disk, magnetic storage, or the like) which is not expressly illustrated.

The RAN 22 and CN 24 may form part of a UMTS network or part of a Evolved Packet System (EPS) network. The CN 24 may be responsible for the switching and routing of data calls and data connections to external networks such as the internet or other defined (external) network, while the RAN 22 may handle radio related functionalities. Put another way, the RAN 22 consists of components which manage the resources of the access network and provides the user with a mechanism to access the core network domain. The core network domain consists of the physical entities which provide support for the network features and telecommunication services. The support provided includes functionality such as the management of user location information, control of network features and services, the transfer (switching and transmission) mechanisms for signalling and for user generated information.

The RAN 22 may be a Universal Terrestrial Radio-Access Network (UTRAN), an evolved UMTS Terrestrial Radio Access Network (E-UTRAN), or a GSM EDGE Radio Access Network (GERAN), for example. The CN 24 may be an Evolved Packet Core (EPC) or UMTS network or GPRS network for example. As will be appreciated, the below-described operation of the RAN 22, in conjunction with the above-referenced operation of the NAS 32 and AS 34, may promote differential treatment of non-user-initiated user-plane data versus user-initiated user-plane data.

Figure 2:
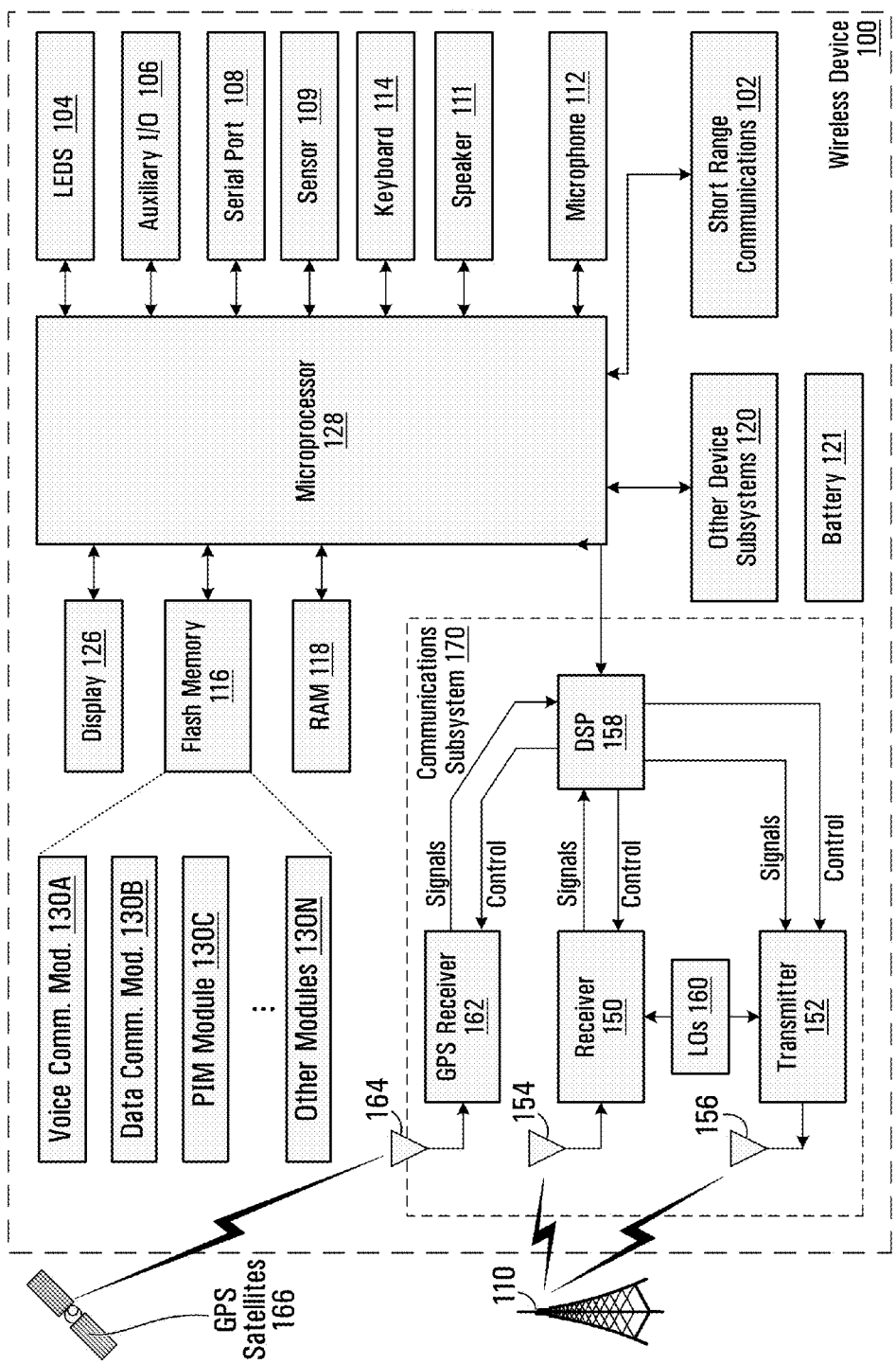
FIG. 2. is a schematic diagram illustrating the user equipment of FIG. 1 in greater detail.

Referring now to FIG. 2, a schematic diagram is shown of an exemplary embodiment of a user equipment, namely a wireless device 100, that may implement any of the device methods described herein. It is to be understood that the wireless device 100 is shown with very specific details for exemplary purposes only.

The wireless device 100 has a housing that may be elongated vertically, or may take on other sizes and shapes (including clamshell housing structures). The keyboard 114 may include a mode selection key, or other hardware or software for switching between text entry and telephony entry. Alternatively, the wireless device 100 may have a housing that does not take on other sizes and shapes.

A microprocessor 128 is shown schematically as coupled between a keyboard 114 and a display 126. The microprocessor 128 controls operation of the display 126, as well as overall operation of the wireless device 100, in response to actuation of keys on the keyboard 114 by a user.

In addition to the microprocessor 128, other parts of the wireless device 100 are shown schematically. These include: a communications subsystem 170; a short-range communications subsystem 102; the keyboard 114 and the display 126, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 120. The keyboard 114, speaker 111, microphone 112, display 126, and LEDs 104 are part of the user-interface.

The wireless device 100 may have a battery 121 to power the active elements of the wireless device 100. The wireless device 100 is in some embodiments a two-way radio frequency (RF) communication device having voice and data communication capabilities. In addition, the wireless device 100 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 100 may also be stored to the RAM 118.

The microprocessor 128, in addition to its operating system functions, enables execution of software applications on the wireless device 100. A predetermined set of software applications that control basic device operations, such as a voice communications module 130A and a data communications module 130B, may be installed on the wireless device 100 during manufacture. In addition, a personal information manager (PIM) application module 130C may also be installed on the wireless device 100 during manufacture. The PIM application is in some embodiments capable of organizing and managing data items, such as e-mail, calendar events, voice mails, appointments, and task items. The PIM application is also in some embodiments capable of sending and receiving data items via a wireless network 110. In some embodiments, the data items managed by the PIM application are seamlessly integrated, synchronized and updated via the wireless network 110 with the device users corresponding data items stored or associated with a host computer system. The application 30 may also be stored in flash memory 26, possibly along with other applications (not expressly shown).

Additional software modules, illustrated as another software module 130N, may be installed during manufacture. The software modules may, for example, include one or more modules that control the execution of the methods described herein.

Communication functions, including data and voice communications, are performed through the communication subsystem 170, and possibly through the short-range communications subsystem 102. The communication subsystem 170 includes a receiver 150, a transmitter 152, a GPS receiver 162, and one or more antennas, illustrated as a receive antenna 154, a transmit antenna 156, and a GPS antenna 164. In addition, the communication subsystem 170 also includes a processing module, such as a digital signal processor (DSP) 158, and local oscillators (LOs) 160.

The specific design and implementation of the communication subsystem 170 is dependent upon the communication network in which the wireless device 100 is intended to operate. For example, the communication subsystem 170 of the wireless device 100 may be designed to operate with the Mobitex™, DataTAC™ or General Packet Radio Service (GPRS) mobile data communication networks, UMTS network, LTE network and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1xEV-DO. The communication subsystem 170 may also be designed to operate with an 802.11 Wi-Fi network, and/or an 802.16 WiMAX network. Other types of data and voice networks, both separate and integrated, may also be utilized with the wireless device 100.

Network access may vary depending upon the type of communication system. For example, in the Mobitex™ and DataTAC™ networks, wireless devices are registered on the network using a unique Personal Identification Number (PIN) associated with each device. In GPRS or UMTS or EPC networks, however, network access is typically associated with a subscriber or user of a device. A GPRS/UMTS/LTE device therefore typically has a subscriber identity module (often referred to as a SIM card) or a User Services Identity Module (USIM), in order to operate on a GPRS or UMTS or EPC network.

When network registration or activation procedures have been completed, the wireless device 100 may send and receive communication signals over the communication network 110. Signals received from the communication network 110 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 110 are processed (e.g., modulated and encoded) by the DSP 158 and are then provided to the transmitter 152 for digital to analog conversion, frequency up conversion, filtering, amplification and transmission to the communication network 110 (or networks) via the transmit antenna 156.

In addition to processing communication signals, the DSP 158 provides for control of the receiver 150, the transmitter 152, and the GPS receiver 162. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 170 and is input to the microprocessor 128. The received signal is then further processed by the microprocessor 128 for an output to the display 126, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 110, as user-initiated user-plane data via the communication subsystem 170.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 100. In addition, the display 126 may also be utilized in voice communication mode, for example, to display the identity of a calling party, the duration of a voice call, or other voice call related information.

Location determination using GPS technology involves receiving GPS signals from GPS satellites 166 on the antenna 164. The GPS signals are received using the GPS receiver 162 and processed by the DSP 158. Typically, GPS signals from at least four satellites are processed. Further details of GPS are known in the art and are omitted for simplicity.

The short-range communications subsystem 102 enables communication between the wireless device 100 and other proximate systems or devices, which need not necessarily be similar devices. For example, the short range communications subsystem may include an infrared device and associated circuits and components, or a Bluetooth™ communication module to provide for communication with similarly-enabled systems and devices.

Figure 3A:
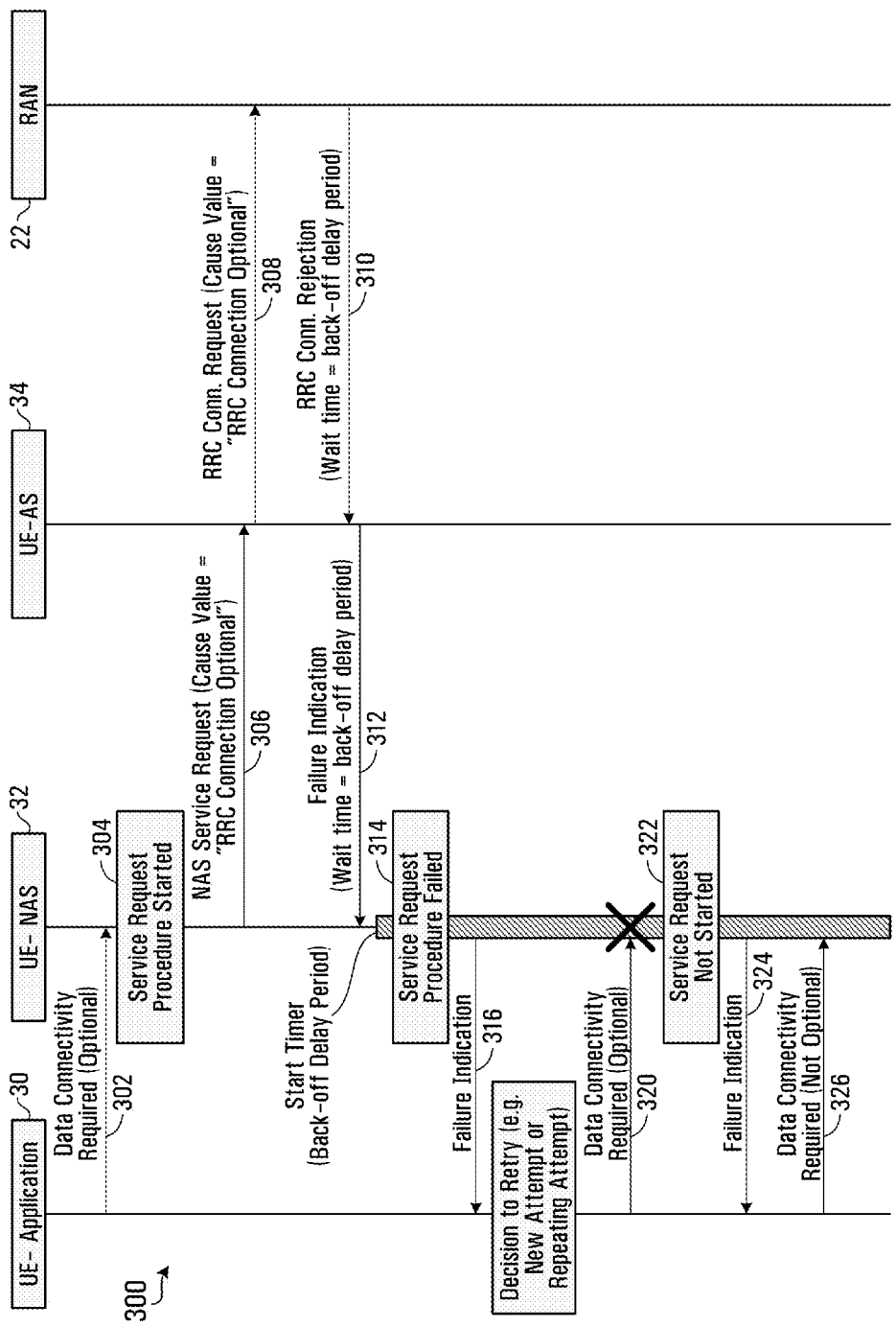
FIGS. 3A and 3B show a sequence diagram illustrating operation of the system of FIG. 1.
Figure 3B:
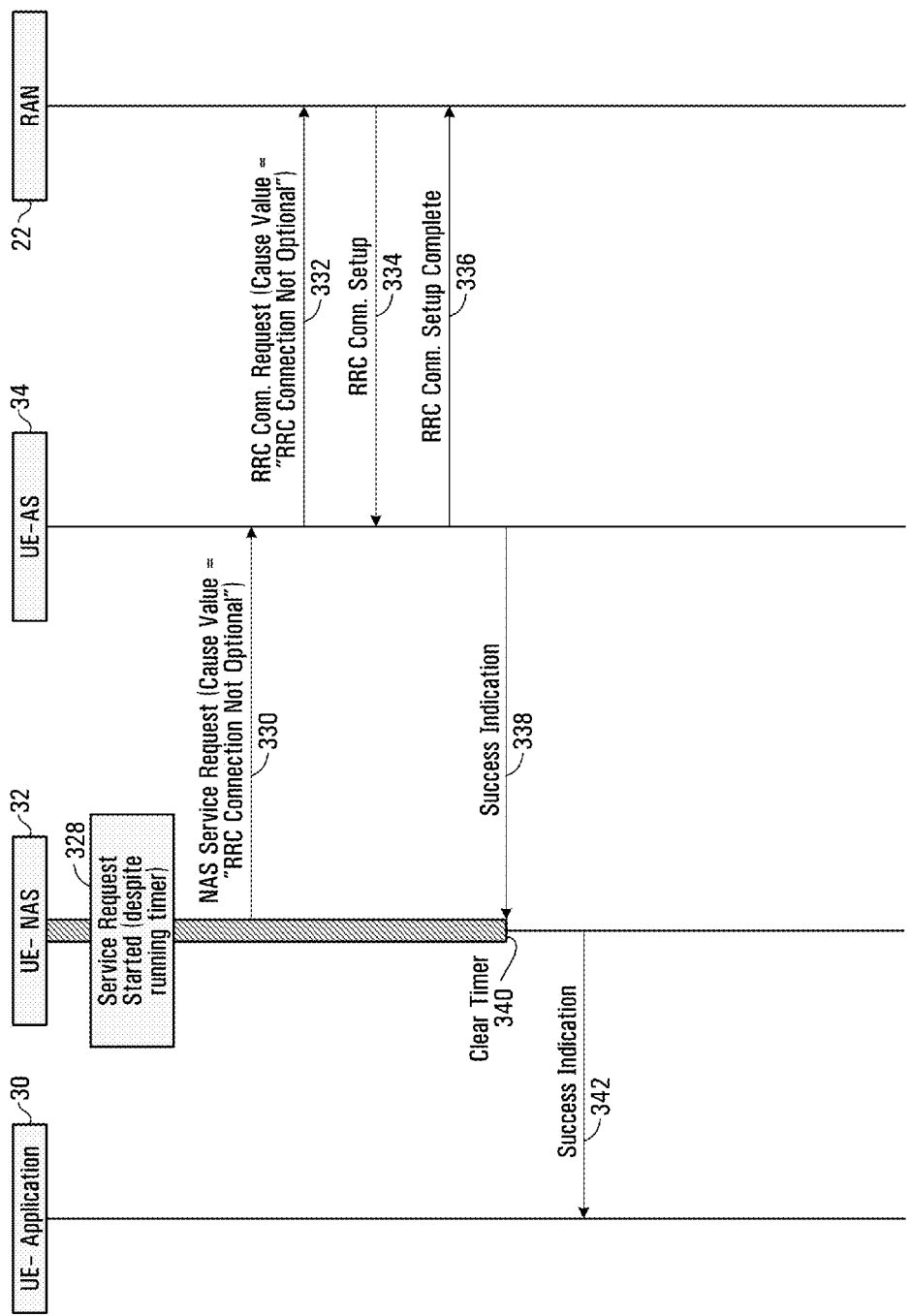
Figure 4:
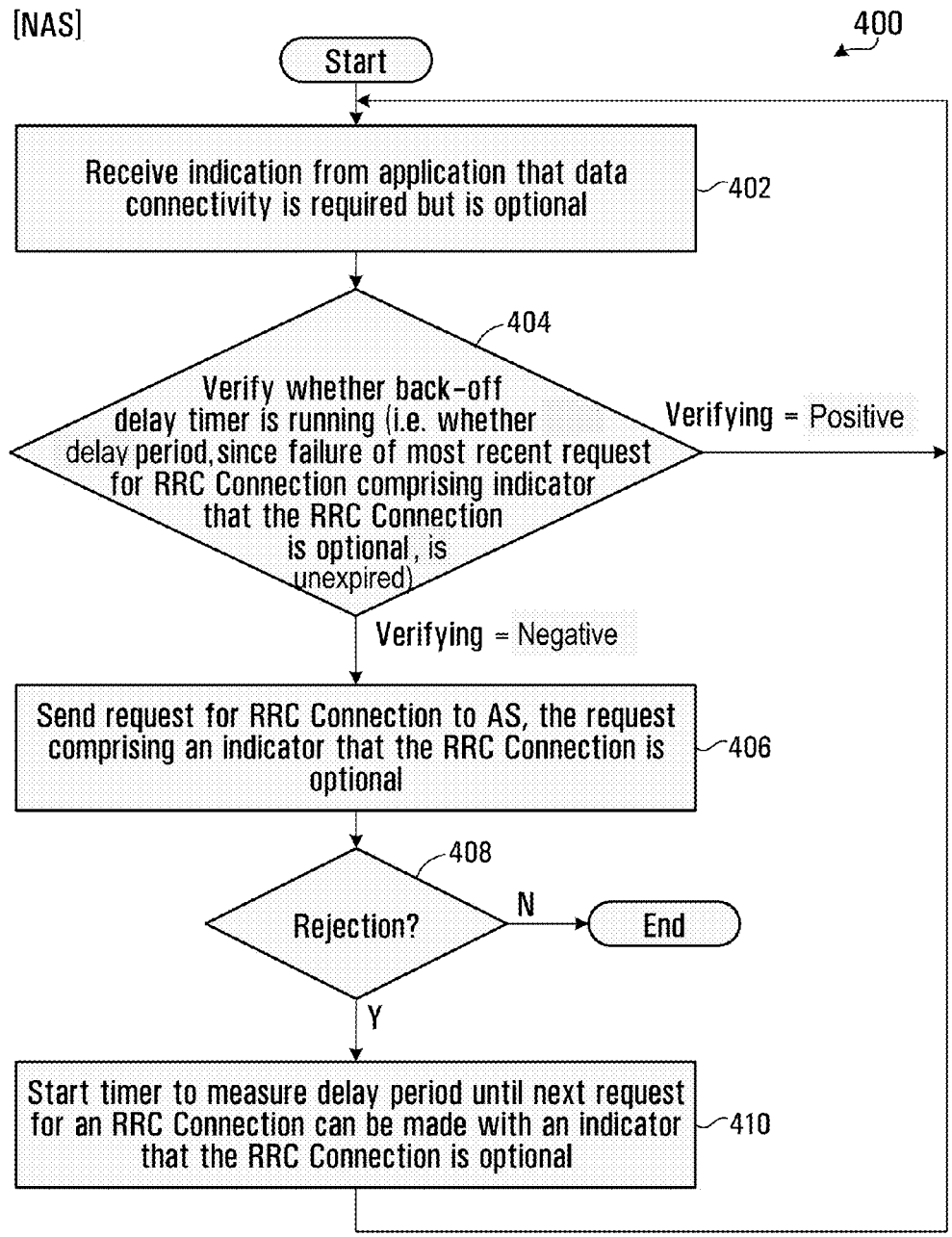
FIG. 4 is a flowchart illustrating operation of the NAS layer of the UE of FIG. 1.
Figure 5:
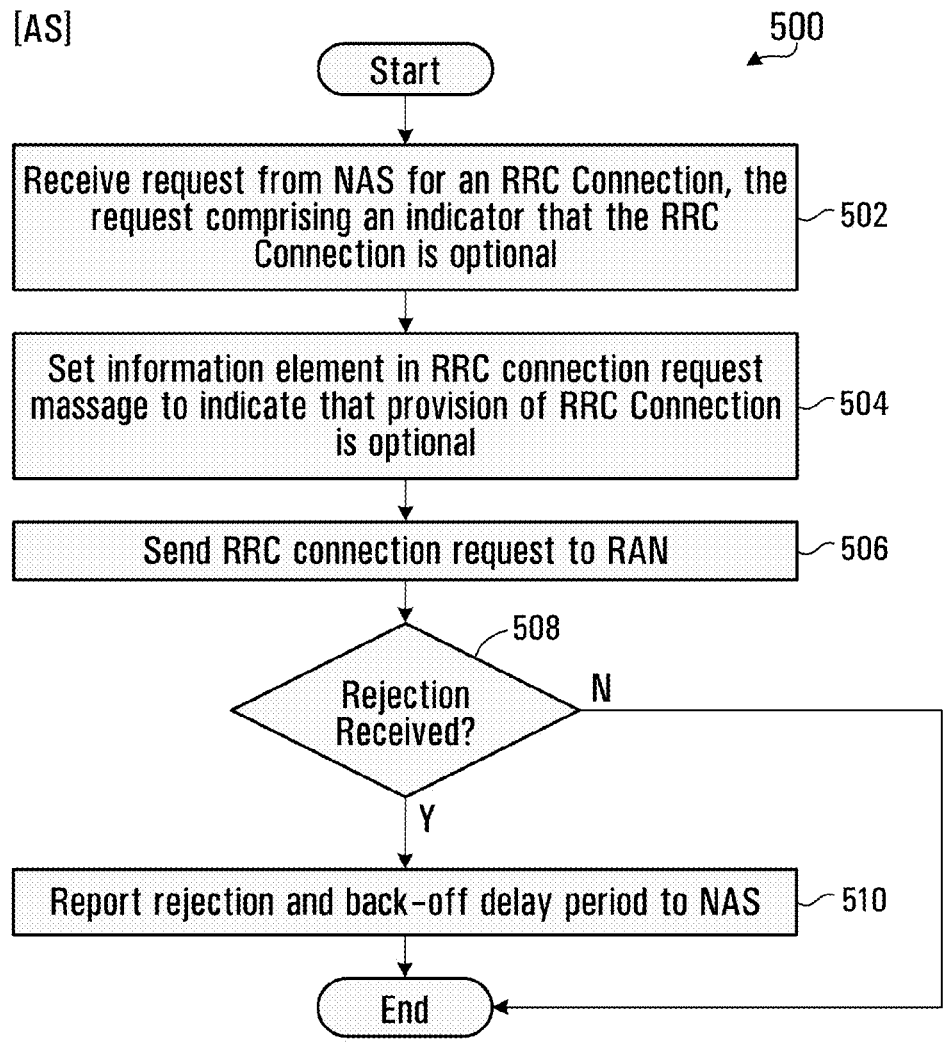
FIG. 5 is a flowchart illustrating operation of the AS layer of the UE of FIG. 1.
Figure 7:
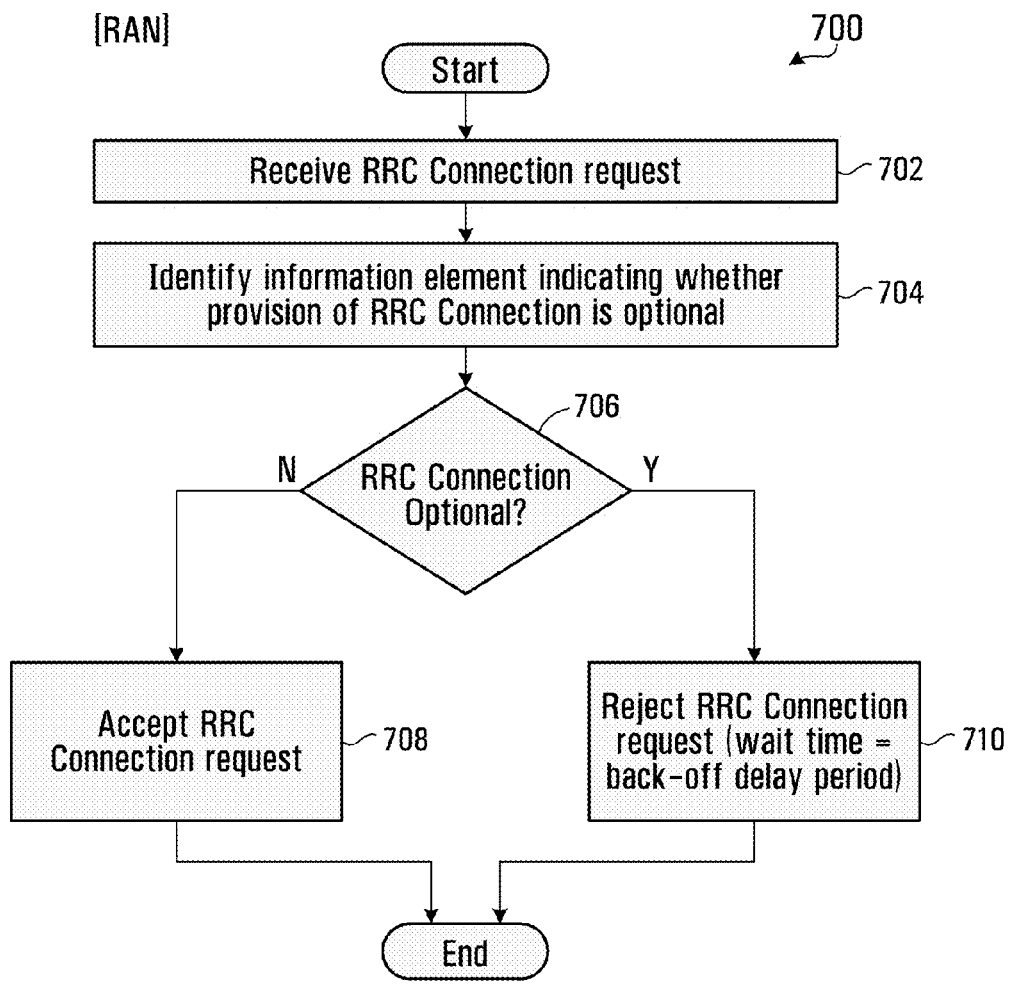
FIG. 7 is a flowchart illustrating operation of the RAN of FIG. 1.

Operation of the system 10 of FIG. 1 for performing radio resource control for differential treatment of non-user-initiated user-plane data versus user-initiated user-plane data is illustrated in FIGS. 3A, 3B, 4, 5 and 7. FIGS. 3A and 3B illustrate a sequence diagram 300 showing operation of, and signalling between, each of the UE application 30, UE NAS layer 32, UE AS layer 34, and RAN 22. FIGS. 4, 5 and 7 are flowcharts illustrating the operation 400, 500 and 700 of the NAS 32, AS 34, and RAN 22, respectively.

For the purposes of the following description, it is presumed that the UE 20 is initially in IDLE mode with an established packet data protocol (PDP) context but no established radio access bearer or in EMM-IDLE mode with an established packet data network (PDN) connection, when no NAS signalling connection between UE and network exists. The term EMM-IDLE mode used in the present document corresponds to the term ECM-IDLE state used in 3GPP TS 23.401. As is known in the art, a UE in IDLE mode is required to request an RRC connection whenever it wants to send any user-plane data via uplink. This is in contrast to a UE in the Connected mode (or more specifically, UMTS Terrestrial Radio Access (UTRA) RRC connected mode), which can be in one of four states:

1. CELL-DCH: A dedicated channel is allocated to the UE in uplink and downlink in this state to exchange data. The UE must perform actions as outlined in Third Generation Partnership Project (3GPP) 25.331.

2. CELL_FACH: no dedicated channel is allocated to the user equipment in this state. Instead, common channels are used to exchange a small amount of bursty data. The UE must perform actions as outlined in 3GPP 25.331 which includes the cell selection process as defined in 3GPP TS 25.304.

3. CELL_PCH: the UE uses Discontinuous Reception (DRX) to monitor broadcast messages and pages via a Paging Indicator Channel (PICH). No uplink activity is possible. The UE must perform actions as outlined in 3GPP 25.331 which includes the cell selection process as defined in 3GPP TS 25.304. The UE must perform the CELL UPDATE procedure after cell reselection or due to expiry of periodic cell update timer.

4. URA_PCH: the UE uses Discontinuous Reception (DRX) to monitor broadcast messages and pages via a Paging Indicator Channel (PICH). No uplink activity is possible. The UE must perform actions as outlined in 3GPP 25.331 including the cell selection process as defined in 3GPP TS 25.304. This state is similar to CELL_PCH, except that URA UPDATE procedure is only triggered due to periodic update or when there is a change in URA.

Referring to FIG. 3A, the application 30 determines that it has unattended, non-user-initiated user-plane data (e.g. an auto-update or ping message, which has been automatically generated due to a lack of user input to the application 30 for some predetermined time period) ready for transmission for a particular Access Point Name (APN) that identifies an IP Packet Data Network (PDN). For example, the application 30 may have been configured to make periodic requests for such user-plane data or may determine that none of the application's output is observable by the user (e.g. the screen is black because the device is in battery saving mode or the output of the application is obscured by output presented by other applications).

Upon making that determination, the application 30 makes a request, or otherwise provides an indication 302, to the NAS 32 that uplink user-plane data is available. In the present embodiment, this indication 302 takes the form of an application programming interface (API) call to the NAS 32. In other embodiments, this indication 302 may take other forms (e.g. sockets).

The indication 302 includes an indicator indicating that the data connectivity is optional. This indicator may for example be set by the application 30 on the basis that the data connectivity is known to be needed for carrying user-plane data that is non-user-initiated and is likely to be unattended. In some embodiments, the indicator may expressly indicate that data connectivity is known to be needed for carrying user-plane data that is non-user-initiated and is likely to be unattended indicate. In some embodiments, the indicator may simply indicate that the data connectivity is optional.

Upon receiving the indication 302 from the application (402, FIG. 4), the NAS 32 becomes aware that uplink data connectivity will be required but that provision of the such data connectivity is optional. Accordingly, a procedure, such as an extended service request procedure, may be started at the NAS 32 (304, FIG. 3A).

In particular, the NAS 32 initially verifies (404, FIG. 4) whether a timer is running. The running timer may indicate that the NAS 32 (or, more generally, UE 20) is in a back-off delay period since a previous request for an RRC connection for unattended, non-user-initiated user-plane data was rejected or ignored (either of the latter circumstances being considered a "failure" of the RRC Connection request). In one embodiment, the back-off delay period that the timer is counting down may have earlier been specified by the RAN 22 and communicated to the UE 20 when a previous request for an RRC Connection for carrying unattended, non-user-initiated user-plane data was rejected. In another embodiment, the minimum back-off delay period may be predetermined (e.g. hard-coded by a manufacturer or user-configured) at the UE 20.

In the present example, it is presumed that either no such failure has previously occurred or, if it has previously occurred, that the minimum back-off delay period has elapsed. As such, the NAS 32 makes a NAS service request instructing the AS 34 to request a RRC Connection from RAN 22 (306, FIG. 3A; 406, FIG. 4). This instruction may also take the form of an API call. As part of this instruction, the NAS 32 provides an indicator, to the AS 34, that the RRC Connection is optional, in this case because the desired radio bearer shall be used (at least initially) for carrying unattended, non-user-initiated user-plane data. The indicator may be a parameter to the API call. Notably, the indicator is distinct from the non-user-initiated user-plane data itself (i.e. the indicator is not the auto-update or ping message).

Upon receiving this instruction (502, FIG. 5), the AS 34 sets an information element in an RRC Connection Request message, based on the received parameter, to indicate that provision of the RRC Connection is optional (504, FIG. 5). As is known in the art, the RRC is a part of the protocol stack that is responsible for the assignment, configuration and release of radio resources between the UE 20 and the RAN 22. The RRC protocol is described in detail in the 3GPP TS 25.331 specifications.

The RRC Connection Request message 600 of the present embodiment may be defined according to definition 600 of FIGS. 6A and 6B.

Referring to FIGS. 6A and 6B, it can be seen that the exemplary message definition is based on the RRC Connection Request message definition specified in the 3GPP TS 36.331, which is the RRC protocol specification for LTE. The message definition could also be made in accordance with 3GPP TS 25.331 specification for 3G. The definition includes a specification of an information element 602 (see FIG. 6B, in bold), RRCConnectionOptional, that is an enumerated type. The information element 602, which may be referred to as a "cause value" (since it may reflect a cause for requesting the radio bearer), is intended to be set to "true" when provision of the RRC Connection is optional (e.g. because the RRC Connection is intended for use with unattended, non-user-initiated user-plane data) and "false" otherwise (e.g. because the RRC Connection is intended for use with user-initiated user-plane data). In the present example, the information element is set to true. Various forms of information elements, such as enumerated types, single bits, flags, or the like, could be used in different embodiments. The information element may constitute an extension of an existing RRC specification, such as that of table D.1.1 in Annex D.1 of 3GPP TS 24.301, and/or TS 24.008.

Once the information element 602 of the RRC Connection Request message has been set, the RRC Connection Request message is sent to the RAN 22 (308, FIG. 3A; 506, FIG. 5).

Referring to FIG. 7, when the RRC Connection Request message is received at the RAN 22 (702, FIG. 7), e.g. by a RAN network element (or simply "RAN element") such as a Radio Network Controller (RNC) in a UMTS network or an evolved Node B (eNB) in an LTE network. The information element 602 of the message is then examined (704 and 706, FIG. 7). If the information element had been found to indicate (in 706, FIG. 7) that provision of the RRC Connection is not optional, then the RRC Connection Request would be accepted (708, FIG. 7), i.e. steps would be commenced to provide the desired radio bearer. The rationale for the acceptance in that case would be to promote acceptable responsiveness (i.e. relatively low latency) at the UE application 30 given that the UE user in that case may be attending to the application, possibly actively awaiting a response to whatever user-plane data is being sent via uplink in the case of user-initiated user-plane data.

In the present example, however, the information element is found to indicate that the radio bearer is to be used, at least initially, to carry unattended, non-user-initiated user-plane data (706, FIG. 7). In this case, the RRC Connection Request may be rejected (310, FIG. 3A; 710, FIG. 7). This rejection may take the form of an RRC Connection Rejection message, which is a form of failure indication indicating that no RRC connection was set up and that no radio access bearer can accordingly be provided. In some embodiments (e.g. in an LTE network), the RRC Connection Request may not have been rejected had it included a different APN or if the RAN 22 had been determined to be lightly loaded.

In one embodiment, the rejection includes an indication of a wait time. This wait time, which may be referred to herein as a back-off delay period, represents a delay period that should elapse before a next an RRC Connection request, comprising an indicator indicating that provision of the RRC Connection is optional or discretionary, should be made. The wait time specified in the rejection may be specific to the case in which the request for the relevant radio resource (e.g. RRC connection in this case) was specified with an indicator indicating that provision of the radio resource is optional or discretionary. This specified wait time may differ from (e.g. be longer than) a standard or default wait time that the RAN or UE may utilize in a different case, namely when a request for a radio resource (e.g. RRC connection) without any such "provision of resource is optional or discretionary" indicator, has been rejected.

The specific wait time in the former case is not considered applicable to any future request for an RRC Connection for carrying, e.g., user-initiated user-plane data or attended non-user-initiated user-plane data, that does not include an indicator indicating that provision of the RRC Connection is optional or discretionary. The latter request can be made at any time, whether or not the timer is running, i.e. whether or not the delay period has elapsed. The rationale for this distinction between the user-initiated versus non-user-initiated user-plane data cases may be as indicated above, i.e. for user-plane data responsiveness to be better in the user-initiated case than in the non-user-initiated case.

Upon receiving the RRC Connection Rejection (310, FIG. 3A; 508, FIG. 5), the AS 34 may report a failure indication to the NAS 32 (312, FIG. 3A; 510, FIG. 5). This may be done by way of return value or return parameter to the original API call made by the NAS 32 to the AS 34 (at 306, FIG. 3A), or otherwise. The failure indication may include an indication of the back-off delay period that was been received from the RAN 22 (or may have been otherwise configured).

At this stage, the NAS 32 service request procedure is determined to have failed (314, FIG. 3A). In view of this fact, the NAS 32 starts a timer (e.g. T33xx, which may be a new timer similar to timers defined by unique combinations of four digits in the 3GPP TS 24.301 standard) to commence waiting the back-off delay period (410, FIG. 4). Again, this is the minimum delay period that is to elapse before a next request can be made for an RRC Connection with an indicator that provision of the RRC Connection is optional. The delay period is represented in FIGS. 3A and 3B as a bold section on the vertical line representing the UE NAS 32 (in FIGS. 3A and 3B, the time axis extends downwardly). The NAS 32 also returns a failure indication to the application 30 to advise it that that the NAS service request procedure has failed, i.e. that no RRC Connection was established (316, FIG. 3A). In some embodiments, no such specific response is provided to the application 30.

At this stage of operation of the present example embodiment, the application 30 or its user may decide to once again try to obtain uplink data connectivity for transmitting unattended, non-user-initiated user-plane data, whether the same user-plane data as before, or possibly new data (318, FIG. 3A). As a result, the application once provides an indication to the NAS 32, e.g. via API call, that uplink user-plane data is available, and in so doing indicates that the data connectivity is optional or discretionary (320, FIG. 3A).

When the NAS 32 receives the API call this time, however (402, FIG. 4), the NAS service request procedure is not started (322, FIG. 3A). The reason is that the verification step (404, FIG. 4) will fail, because the timer is in fact running, indicating that the back-off delay period has not yet expired. The NAS 32 accordingly returns a failure indication to the application 30 (324, FIG. 3A). It will be appreciated that this failure tends to avoid or reduce RAN 22 congestion that might otherwise result if unattended, non-user-initiated user-plane data uplink requests were permitted to be made as frequently as desired (i.e. without waiting for the back-off delay period between such requests).

In contrast, the same treatment is not given to requests for uplink data connectivity for transmitting user-plane data that is, say, user-initiated or that is for a different Access Point Name (APN). For example, at this stage a user may interact with the application 30 or another application executing at the UE 20. If there is user interaction, may be, for example, any one or more of: tactile, such as the pressing of a button or selection a graphical user interface element of the application; auditory, such as the speaking of a command into a microphone; visual, such as the performance of a gesture before a camera; or otherwise. The interaction may cause the application 30 to now have user-plane data ready for transmission that is user-initiated. Alternatively, one of the one or more applications on the UE may have attended, non-user-initiated user-plane data (e.g. a request for updated map data to be sent to a mapping application that is likely to be actively monitored by a user) ready to send.

In this case, the application 30 makes another API call to the NAS 32 indicating that data connectivity is required for sending the new user-plane data (326, FIG. 3A). However, this time it is indicated, in the API call, that provision of the data connectivity is not optional. This may be indicated expressly in the API call, or it may be understood from the lack of any indication that the data connectivity is optional or discretionary.

Upon receiving the API call (402, FIG. 4), the NAS 32 service request procedure is started at NAS 32 (328, FIG. 3B).

Notably, this is done despite the fact that the timer is running, i.e. that the back-off delay period has not yet expired. That is, unlike the case of the repeated API call 320, this API call 326 is (for example) not immediately met with a failure indication 324 in return. The reason is that, unlike the case of API call 320, in this case the user-plane data to be sent is, e.g. user-initiated, or non-user-initiated but attended.

As such, the NAS 32 makes a NAS service request instructing the AS 34 to request a RRC Connection from RAN 22 (306, FIG. 3A; 406, FIG. 4). In so doing, the NAS 32 provides an indicator, to the AS 34, that the RRC Connection is not optional. Upon receiving this instruction (502, FIG. 5), the AS 34 sets an information element in an RRC Connection Request message, based on the received parameter, to indicate that provision of the RRC Connection is not optional (not expressly shown in FIG. 5). The RRC Connection Request message is then sent to the RAN 22 (332, FIG. 3B).

At RAN 22 (or, more precisely, at a network element of RAN 22), operation 702-706 of FIG. 7 will occur as before, except that now it will be discovered, in 706, that provision of the RRC Connection is not optional. As a result, the RRC Connection Request will be accepted (708, FIG. 7), and an RRC Connection Setup message is sent from RAN 22 to the AS 34. The AS 34 response with an RRC Connection Setup Complete message, indicating that the RRC Connection has been established, and the user-plane data uplink can ultimately proceed. The AS 34 also sends a success indication 338 to the NAS 32.

At the NAS 32, the earlier started timer may be cleared in view of the success indication 338, which indicates successful provision of an RRC Connection. The term "clearing" as used herein with respect to a timer may refer to stopping, resetting or zeroing the timer, for example. A timer may be a hardware, firmware or software-based component of the UE 20.

In some embodiments, the responsibility for effecting the back-off delay upon sending requests for RRC Connections that are optional may lie with the AS 34 rather than the NAS 32. Such an embodiment is illustrated in FIG. 8.

Figure 8:
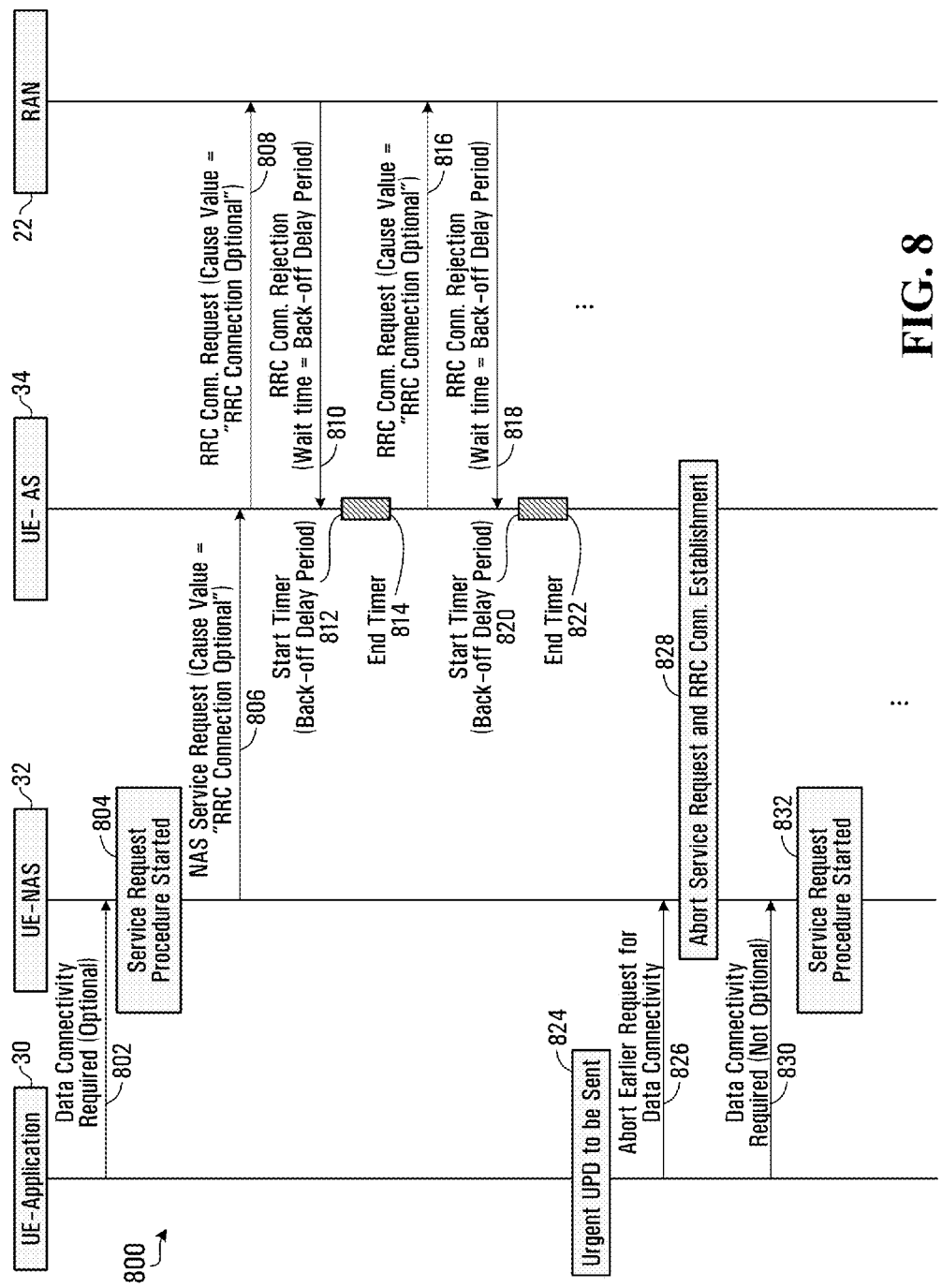
FIG. 8 is a sequence diagram illustrating operation of an alternative embodiment system.

Referring to FIG. 8, a sequence diagram 800 showing operation of, and signalling between, each of the UE application 30, UE NAS layer 32, UE AS layer 34, and RAN 22, is illustrated. In FIG. 8, it is again presumed that the UE 20 is initially in Idle mode with an established PDP context or an established PDP Connection but no established radio bearer.

In FIG. 8, operations 802-810 are analogous to operations 302-310 of FIG. 3A, respectively, which are described above and therefore need not be described again here.

Upon completion of operation 810, of FIG. 8, the RRC Connection Rejection message will be received at the AS 34. The message may contain the back-off delay period, i.e. the minimum back-off delay period until another RRC Connection Request can be made for a radio bearer for carrying non-user-initiated user-plane data.

But here, instead of the reporting a failure indication with a back-off delay period (or, in some embodiments, without such a delay period) back to the NAS 32 as in 312, FIG. 3A above, a timer is started to commence waiting the NUIUPD minimum back-off delay period at the AS 34 layer (812, FIG. 8). The NUIUPD delay period is represented in FIG. 8 as a bold section on the vertical line representing the UE AS 34. At this stage, the NAS 32 still has no indication of whether or not the RRC Connection Request was successful.

Upon expiry 814 of the timer at the AS 34, i.e. when the delay period has elapsed, the AS 34 executes a retry, i.e. once again sends the same RRC connection request message to the RAN 22 (816, FIG. 8) as had been earlier sent (808, FIG. 8). Subsequent operations 818, 820 and 822 are analogous to operations 810, 812 and 814. Operations 812-818 may be referred to as a "retry cycle." This retry cycle may be repeated any number of times, possibly up to a predetermined maximum number. A possible advantage of waiting and retrying at the AS 34 layer is that modification of the NAS 32 layer for providing a back-off and retry functionality may be unnecessary, or a reduced complexity of the NAS 32.

As the retry cycles proceed, user interaction at the UE 20 may cause the application 30 to generate new user-plane data that is either user-initiated, or non-user-initiated but attended (824, FIG. 8). In this case, the application 30 may instruct the NAS 32 to abort the NAS service request procedure that was started due to the need for a RRC Connection Request for non-user-initiated, user-plane data. Aborting the procedure may terminate any ongoing retry cycle (826, FIG. 8). In response, the NAS 32 aborts the NAS service request procedure and communicates appropriately with the AS 34 (details omitted) to terminate the retry cycle at the AS 34 layer (828, FIG. 8). This is done to avoid interfering with the RRC Connection Request that will shortly be sent in an attempt to obtain a radio bearer for sending the user-plane data that has just become available. Alternatively, another application than application 30 may generate new user-plane data that is either user-initiated, or non-user-initiated but attended. In this case, it is likely that the other application would not instruct the NAS 32 to abort the NAS service request procedure. Rather, the NAS 32 may detect the ongoing NAS service request procedure started in response to the earlier request for an RRC Connection that is optional or discretionary, and may abort it. The remaining steps may be as described above.

At this stage, the application 30 (if it instructed the NAS 32 to abort the NAS service request procedure), may make an API call to the NAS 32 indicating that data connectivity is required and that provision of the data connectivity is not optional (830, FIG. 8). The NAS 32 may then commence a NAS service request for obtaining the RRC Connection (832, FIG. 8), triggering an RRC Connection Request similarly to what was done at 328 onward in FIG. 3B.

In some embodiments, the initial state of the UE 20 may not be idle mode. Rather, the UE 20 may be in one of the connected mode states, without a dedicated radio access bearer. For example, in a 3G network, the UE 20 may be in one of the states CELL_FACH, CELL_PCH or URA_PCH. In that case, the AS 34 layer may not send a RRC Connection Request message in accordance with FIGS. 6A and 6B. Rather, the AS 34 may instead send a Cell Update message. A Cell Update message is an example of a radio resource request message. The cell update message may be defined according to definition 900 of FIGS. 9A and 9B.

Figure 9B:
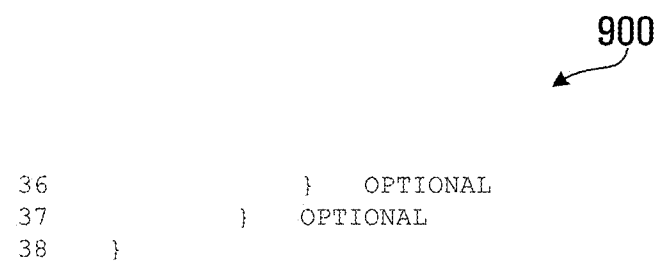

Referring to FIGS. 9A and 9B, it can be seen that the exemplary definition is based on the Cell Update message definition specified in the 3GPP TS 25.331, which is the RRC protocol specification for UMTS. The definition shows the specification of an information element 902 (see FIG. 9B, in bold), RadioAccessBearerOptional, that is an enumerated type. This information element 902 is intended to be set to "true" when provision of a radio access bearer for the existing RRC Connection is optional or discretionary (e.g. because the radio access bearer is intended for use with unattended, non-user-initiated user-plane data) and "false" otherwise (e.g. because the radio access bearer is intended for use with user-initiated user-plane data). Various forms of information elements, such as enumerated types, single bits, flags, or the like, could be used in different embodiments. The information element may constitute an extension of an existing RRC specification, such as that of table D.1.1 in Annex D.1 of 3GPP TS 24.301 and/or TS 24.008. In this case, operation may differ somewhat from what is shown in FIGS. 3 and 8 above. For example, the messages that are sent may be a Cell Update and an RRC Connection Reject with Cell Update Confirm (Wait Time).

In some embodiments, the RAN 22 may not provide any indication of a back-off delay period in its rejection of a RRC Connection Request message or a Cell Update message. In such cases, that delay period may be hard-coded or user-configured at the UE 20.

As discussed above, in some embodiments, the RAN 22 may not provide an explicit rejection of RRC Connection Requests or Cell Update messages in which the information element indicates that non-user-initiated user-plane data is to be transmitted. Rather, the RAN 22 may simply ignore or "drop" such messages, while honoring messages in which the information element indicates that user-initiated user-plane data is to be transmitted.

In this case, the timer at the NAS 32 or AS 34 of the UE 20 may be started if the AS does not receive any explicit response from the network in response to the request within a predetermined time period. Not receiving an indication may suggest to the AS that the RAN 22 is congested or that the RAN 22 did not receive the request. The UE may therefore start the timer during which subsequent requests for RRC Connections whose provision is optional or discretionary will not be transmitted to the network.

Numerous modifications and variations of the present disclosure are possible in light of the above teachings. It is therefore to be understood that within the scope of the appended claims, the disclosure may be practiced otherwise than as specifically described herein.

For example, while the specific examples have assumed a 3G or LTE network, the same approach can be applied in other networks.

Idle and Connected mode behaviors are described in detail in the 3GPP specifications TS 25.304 and TS 25.331, which are hereby incorporated by reference. 3GPP specifications TS 36.331, TS 24.301, TS 24.301 and TS 24.008 are also incorporated by reference herein.

It will be appreciated that the timer need not necessarily be a countdown timer in a classic sense. Any mechanism capable of measuring a delay period can act as a timer.

Alternative wording for some of the above embodiments, and/or description of further embodiments, is provided below.

Upon receiving a rejection message at the UE, from the network:

1. and if the upper (e.g. application) layers of a UE initiate a second attempt for sending a connection request for communicating "user-plane control data" (i.e. provision of RRC Connection is optional or discretionary), then since a previous request for communicating "user-plane control data" was rejected, a subsequent request may not be attempted for a while or the subsequent request may be delayed. A second attempt for a connection for communicating "user-plane control data" need not be attempted if a previous request for communicating "user-plane control data" was rejected or while one or more timers are running.

a. In one embodiment, requests for a connection for communicating "user-plane control data" can be buffered and considered "pending" if one of the requests for a connection for communicating "user-plane control data" is rejected by the network. The layer in the UE that buffers the request after initial rejection, can in some cases be thought of as an adaption layer, situated above the AS layer. The buffering may also take place in other layers. An adaption layer (which is above the NAS layer, and may be similar to an application layer) may reattempt any buffered request upon expire of applicable timers.

b. In yet another embodiment, the upper layers need not buffer the requests if one of the requests for a connection for communicating "user-plane control data" is rejected by the network. The upper layers are notified of a rejection or error per request. The UE 20 may start a timer. The UE may retry requests for a connection for communicating "user-plane control data".

2. Alternatively, if the upper layers in the UE initiate a second request to attempt for sending a request for one of more connections that is also to be used for communicating other data than "user-plane control data", the UE may proceed with this second request. When the UE receives an indication that the second request is accepted by the network, the connections or established (E-)RABs may also be used for communicating the "user-plane control data", if the access technology in use provides bearers or (E-)RABs suitable for "user-plane control data" when establishing an RRCConnection (Note that this may require sending an indication to the higher layers. Upon receipt of the indication, "user-plane control data" may be offered to the AS layer for transmission using the provided bearers, if suitable or matching provided bearers have been established). This could be useful:

a. if the request (or a retransmission of that request) for the connection for communicating "user-plane control data" is considered to be pending. The data or IP packets waiting for the pending request to complete could then use bearers or (E-)RABs suitable for "user-plane control data";

b. if a third attempt for sending a request for one of more connections that is to be used for communicating "user-plane control data" arrives for the bearers or (E-)RABs suitable for "user-plane control data".

An advantage of considering a request "pending" even though it was explicitly or implicitly rejected, is that at least some upper layers (including applications) would not need modification.

Eventually, a response such as a rejection of the request, that is considered to be "pending", can be indicated to the upper layers if sufficient time has passed, e.g. prior to the upper layer timing out.

Alternatively, a layer within a UE may employ a timer. The timer will be initiated upon receiving a rejection for a request for communicating "user-plane control data". While the timer is running, no requests for communicating "user-plane control data" will be propagated to the network. Requests for communicating other data than "user-plane control data" will be propagated to the network. A successful request for communicating other data than "user-plane control data" may clear the timer or stop the timer. If no timer is running, if a subsequent attempt for sending a request for one of more connections that is to be used for communicating "user-plane control data" is received for other bearers or (E-)RABs than the ones established due to the successful request, the subsequent request may be propagated.

In a variation of the previous embodiment, upon detecting successful request for communicating other data than "user-plane control data" for a PDP Connection or a PDP Context, the timer need not be cleared. Instead of clearing the timer, the presence of the (E-)RABs suitable for "user-plane control data" for the PDP Connection or the PDP Context, is sufficient for the "user-plane control data" to be propagated (i.e. the "user-plane control data" is transmitted to the network). "user-plane control data" not using an established E-)RABs need not be propagated and a request for corresponding RRC-Connections may be rejected or considered "pending". Typically, the E-UTRAN, when a UE requests an RRCConnection upon transitioning from IDLE mode to CONNECTED mode, establishes DRBs for all EPS Bearer Contexts when establishing an RRCConnection. On the other hand, for other access networks (UMTS), when a UE requests an RRCConnection upon transitioning from IDLE mode to CONNECTED mode, may not establish RABs for all PDP Contexts when re-establishing an RRCConnection. A UE using E-UTRAN can use the re-established bearers for "user-plane control data", even though such a request was previously rejected. Any timer preventing the UE from requesting RRC-Connection for "user-plane control data" should thus be cleared or stopped. In case of the UE using other access network technologies than E-UTRAN, the UE needs to check if the bearer that was re-established is actually the bearer the upper layer attempts to use for "user plane control data". If it is found the upper layer requires a bearer that has not been established, the request for this bearer may be subject to a timer (e.g. timer A) preventing the UE from requesting RRC-Connection for "user-plane control data". If it is found the upper layer requires the bearer that has been established while the timer is running (e.g. for transmitting data other than "user-plane control data"), the request for this bearer need not be subject to the timer A, where timer A prevented the UE from requesting RRCConnection for "user-plane control data" while it is running.

In other words, whether the request to establish the bearer for transmitting data other than "user plane control data" may be sent.

Alternative Wording for Some of the Above Embodiments

If either a first rrcConnectionRequest is transmitted to establish a first RRC Connection or a cellUpdate message is transmitted in respect of an already existing first RRCConnection, based upon an indication of the upper layers, a first property of the data to be communicated using the RRCConnection may be indicated in the message. An example of a property of the data to be communicated is userPlaneControlData.

If a response to the first rrcConnectionRequest or cellUpdate message is received, the response indicating a rejection, the UE does not attempt to transmit data of the first property, until a first condition is satisfied.

The first condition to be satisfied after which the UE can communicate data of a first property includes:
- expiry of a timer B
- establishing a RRCConnection for data without first property or a different property than the first property.
- establishing one or more (E-)RABs
- clear of timer B or stopping of timer B due to one of establishing one or more (E-)RABs and establishing a RRCConnection for data without first property or a different property than the first property If the first condition to be satisfied is satisfied, a second rrcConnectionRequest or cellUpdate message, the message including the first property of the data to be communicated, may be propagated.

Upon receiving the response indicating the rejection, the rrcConnectionRequest or cellUpdate message is considered pending until a second condition is satisfied.

The second condition to be satisfied, includes:
- expiry of one or more retransmission timers related to the rrcConnectionRequest or cellUpdate message, after which upper layers within the UE are provided with an indication of failure related to the transmission of the rrcConnectionRequest or cellUpdate message;
- the satisfying of the first condition; after which if no RRC-Connection has been established, the pending message is retransmitted; or if RRCConnection has been established, the availability of RRCConnection connectivity is indicated to the upper layers.

If an access network node has received the rrcConnectionRequest or a first cellUpdate message, if the messages includes an indication that the data to be communicated is of a first property, the access network node may respond with a message indicative of a rejection.

Still further aspects of one or more exemplary embodiments are described below and illustrated in FIGS. 10A-10?.

CT1: EMM Modes and NAS Signalling Connection
TS 24.301
1. Establishment of the NAS Signalling Connection
When the UE is in EMM-IDLE mode and needs to transmit an initial NAS message, if timer TtrafficType is running and if the trafficType is not indicated by the information received from upper layers and the call type is not set to "emergency calls", the UE shall request the lower layer to establish a RRC connection. In this request to the lower layer the NAS shall provide to the lower layer the RRC establishment cause and the call type as specified in annex D of this specification, if received from the upper layers when the need to transmit an initial NAS message was indicated. If the request to the lower layer to establish a RRC connection resulted in the establish a RRC connection or resulted in the transmission of the initial NAS message and successful handling by the RAN of the initial NAS message or the UE considers the NAS signalling connection established, the timer TtrafficType is cleared or the timer TtrafficType is stopped;

if timer TtrafficType is running and if the trafficType is indicated by the information received from upper layers, the UE shall not request the lower layer to establish a RRC connection for transmit the initial NAS message, unless the call type is set to "emergency calls". The UE shall indicate the failure to establish the NAS signalling connection to the upper layers; or the UE shall request the lower layer to establish a RRC connection. In this request to the lower layer the NAS shall provide to the lower layer the RRC establishment cause and the call type as specified in annex D of this specification, and the traffic type, if received from the upper layers when the need to transmit an initial NAS message was indicated.

If the lower layers indicated the failure to establish the RRC connection (see 3GPP TS 36.331[22]) for trafficType as indicated by the information received from upper layers when the lower layer was requested to establish the RRC connection, then timer TtrafficType is started.

NOTE 1: The traffic type is set in accordance with information provided by upper (e.g. application) layers, the upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.)

In S1 mode, when the RRC connection has been established successfully, the UE shall enter EMM-CONNECTED mode and consider the NAS signalling connection established.

The network may use the traffic type indication for AS level congestion control on a per access network node basis and APN based congestion control.

TS 24.008

1.X Establishment of the NAS Signalling Connection for Traffic Type as Indicated by the Upper Layers When the MS is in MM-IDLE mode and needs to transmit an initial NAS message with a trafficType as indicated by the information received from upper layers, if:

if timer TtrafficType is running, the MS shall not request the lower layer to establish a RRC connection for transmit the initial NAS message, unless the MS is performing an attach for emergency bearer services. The MS shall indicate the failure to establish the NAS signalling connection to the upper layers; or if timer TtrafficType is not running the MS shall request the lower layer to establish a RRC connection. In this request to the lower layer the NAS shall provide to the lower layer the traffic type as received from the upper layers.

If the lower layers indicated the failure to establish the RRC connection (see 3GPP TS 25.331 [ab]) for trafficType as indicated by the information received from upper layers when the lower layer was requested to establish the RRC connection, then timer TtrafficType is started.

NOTE 1: The traffic type is set in accordance with information provided by upper layers, the upper layers provide information indicating if the traffic is considered at least one of Unattended Data Traffic, status update messages related to social networking applications, radio connection requests that are not manually initiated by the end users (through tactile interaction with the mobile devices e.g. dialling a number to call or manually sending an email, "user-plane control data", etc.

When the RRC connection has been established successfully, the MS shall enter MM-CONNECTED mode and consider the NAS signalling connection established.

The network may use the traffic type indication for AS level congestion control on a per access network node basis and APN based congestion control.

In some embodiments, the trafficType if indicated by the information received from upper layers comprises one of an indication that a Radio Resource Control (RRC) Connection optionally to be provided and an indication that the Radio Resource message is optionally to be successfully handled.

In some embodiments, the trafficType if indicated by the information received from upper layers comprises one of an indication that a Radio Resource Control (RRC) Connection is not optionally to be provided and an indication that the Radio Resource message is not optionally to be successfully handled.

In some embodiments, if the trafficType is not indicated by the information received from upper layers then this comprises an indication indicating one of a Radio Resource Control (RRC) Connection is not optionally to be provided and a Radio Resource message is not optionally to be successfully handled.

In some embodiments, the timer is in layer 3, or higher than layer 2, in the protocol stack.

The following clauses provided a further description of example apparatuses, methods and/or computer readable media.

Clause 1. A method at a user equipment (UE), the method comprising:

determining that an indicator exists at the UE, the indicator indicating that a delay period since a Radio Resource Control (RRC) Connection to be provided was not provided by a radio access network (RAN) is unexpired;

during the delay period, sending a request for an RRC Connection to the RAN; and upon determining that the requested RRC Connection has been provided, clearing the indicator.

In the foregoing, the indicator may be a timer, e.g. at the AS or NAS layer. This timer could be used in this manner in respect of any radio resource request, whether embodied by an RRC Connection Request message, Cell Update message, or otherwise.

Clause 2. A method at a user equipment (UE), the method comprising:

determining that a timer is running, the timer indicating that a first radio resource request message, the first radio resource request message optionally to be successfully handled, was not successfully handled by a radio access network (RAN);

while the timer is running, sending a second radio resource request message to the RAN; and upon determining that the second radio resource request message has been successfully handled, clearing the timer.

Clause 3. The method of clause 2 wherein the first radio resource request message comprises an information element indicating that successful handling is optional.

Clause 4. The method of any preceding clause wherein successful handling of the second radio resource request message comprises receiving a response to the second radio resource request message at the UE.

Clause 5. The method of any preceding clause additionally comprising detecting that the first radio resource request message has not been successfully handled.

Clause 6. The method of clause 5 wherein the detecting that the first radio resource request message has not been successfully handled comprises one of receiving, at the UE, a rejection message to the first radio resource request message and receiving, at the UE, no response to the first radio resource request message.

Clause 6. The method of any preceding clause wherein the determining that the timer is running further comprises starting the timer.

Clause 7. The method of any preceding clause wherein detecting that the first radio resource request message has not been successfully handled further comprises starting the timer.

It will be appreciated that a radio resource request message with an indicator indicating that provision of the radio resource (e.g. RRC Connection or radio access bearer) is optional or discretionary may comprise a message without an information element indicating that provision of the RRC Connection is not optional or discretionary.

Conversely, it will be appreciated that a radio resource request message with an indicator indicating that provision of the radio resource is not optional or discretionary may comprise a message without an information element indicating that provision of the RRC Connection is optional or discretionary.

What is claimed is:

1. A method at a user equipment (UE), the method comprising:

determining that a timer is running, the timer indicating that a Radio Resource Control (RRC) Connection requested as optionally to be provided was not provided by a radio access network (RAN);

while the timer is running, sending a request for the RRC Connection to the RAN; and upon determining that the requested RRC Connection has been provided, clearing the timer.

2. The method of claim 1 wherein sending the request comprises sending an RRC Connection Request message comprising an information element indicating that the provision of the requested RRC Connection is not optional.

3. The method of claim 1 wherein the RRC Connection was requested as optionally to be provided by sending an RRC Connection Request message comprising an information element indicating that provision of the RRC Connection is optional.

4. The method of claim 1 wherein the determining that the requested RRC Connection has been provided comprises receiving an RRC Connection Setup message at the UE.

5. The method of claim 1 wherein the timer is maintained in the NAS layer of the UE.

6. The method of claim 1 wherein the timer is maintained in the AS layer of the UE.

7. A method at a user equipment (UE), the method comprising:
sending a first request for a first Radio Resource Control (RRC) Connection, the first request comprising an indicator indicating that provision of the RRC Connection is optional;
upon receiving an indication that the first RRC Connection was not provided, starting a timer;
while the timer is running, sending a second request for a second RRC Connection, the second request comprising an indicator indicating that provision of the RRC Connection is not optional; and
upon receiving an indication that the second RRC Connection was provided, clearing the timer.

8. The method of claim 7 wherein the indication that the first RRC Connection was not provided comprises receipt of a rejection of the first request.

9. The method of claim 8 wherein the rejection is an RRC Connection Reject message.

10. The method of claim 7 wherein the indication that the first RRC Connection was not provided comprises an absence of a response to the first request within a predetermined time period.

11. A user equipment (UE) comprising a processor operable to:
determine that a timer is running, the timer indicating that a Radio Resource Control (RRC) Connection requested as optionally to be provided was not provided by a radio access network (RAN);
while the timer is running, send a request for the RRC Connection to the RAN; and
upon determining that the requested RRC Connection has been provided, clear the timer.

12. The user equipment of claim 11 wherein the sending of the request comprises sending an RRC Connection Request message comprising an information element indicating that the provision of the requested RRC Connection is not optional.

13. The user equipment of claim 11 wherein the requesting of the RRC Connection as optionally to be provided comprises sending an RRC Connection Request message comprising an information element indicating that provision of the RRC Connection is optional.

14. The user equipment of claim 11 wherein the determining that the requested RRC Connection has been provided comprises receiving an RRC Connection Setup message at the UE.

15. A user equipment (UE) comprising a processor operable to:
send a first request for a first Radio Resource Control (RRC) Connection, the first request comprising an indicator indicating that provision of the RRC Connection is optional;
upon receiving an indication that the first RRC Connection was not provided, start a timer;
while the timer is running, send a second request for a second RRC Connection, the second request comprising an indicator indicating that provision of the RRC Connection is not optional; and
upon receiving an indication that the second RRC Connection was provided, clear the timer.

16. The user equipment of claim 15 wherein the indication that the first RRC Connection was not provided comprises receipt of an express rejection of the first request.

17. The user equipment of claim 16 wherein the express rejection is an RRC Connection Reject message.

18. The user equipment of claim 15 wherein the indication that the first RRC Connection was not provided comprises an absence of any response to the first request within a predetermined time period.

19. A non-transitory machine-readable medium storing instructions that, upon execution of a processor at a user equipment (UE), causes the UE to:
determine that a timer is running, the timer indicating that a Radio Resource Control (RRC) Connection previously requested as optionally to be provided was not provided by a radio access network (RAN);
while the timer is running, send a request for the RRC Connection to the RAN; and
upon determining that the requested RRC Connection has been provided, clear the timer.

20. A non-transitory machine-readable medium storing instructions that, upon execution of a processor at a user equipment (UE), causes the UE to:
send a first request for a first Radio Resource Control (RRC) Connection, the first request comprising an indicator indicating that provision of the RRC Connection is optional;
upon receiving an indication that the first RRC Connection was not provided, start a timer;
while the timer is running, send a second request for a second RRC Connection, the second request comprising an indicator indicating that provision of the RRC Connection is not optional; and
upon receiving an indication that the second RRC Connection was provided, clear the timer.

21. A method at a user equipment (UE), the method comprising:
sending a first type of request for a Radio Resource Control (RRC) Connection, the first type of request indicating that provision of the RRC Connection is optional;
receiving an indication that the RRC Connection was not provided in response to the first type of request;
in response to the indication that the RRC connection was not provided, not sending a further first type of request for a time period.

22. A method according to claim 21, wherein the time period is a predetermined time period.

23. A method according to claim 21, further comprising sending a second type of request for a RRC Connection after the sending of the first type of request, the second type of request indicating that provision of the RRC Connection is not optional; and upon receiving an indication that the RRC Connection was provided in response to the second type of request, the UE ignoring any of the time period remaining.

24. A method according to claim 23, wherein in response to the indication that the RRC connection was not provided in response to the first type of request, the UE starts a timer to monitor the time period and the UE ignores any of the remaining time period by clearing the timer.

25. A method according to claim 21, wherein in response to the indication that the RRC connection was not provided, the UE starts a timer to measure the time period.

\* \* \* \* \*